(12) United States Patent  
Crawford et al.

(10) Patent No.: US 8,449,212 B2
(45) Date of Patent: May 28, 2013

(54) FLOOR MAINTENANCE TOOL AND METHOD

(75) Inventors: Charles A. Crawford, Racine, WI (US); Andrew M. Bober, Racine, WI (US); Craig Conner, Madison, WI (US); Mark Cors, Columbus, WI (US); Nicholas Reback, Monona, WI (US); Daniel Lee, Monticello, WI (US)

(73) Assignee: Diversey, Inc., Sturtevant, WI (US)

( * ) Notice: Subject to any disclaimer, the term of this patent is extended or adjusted under 35 U.S.C. 154(b) by 0 days.

(21) Appl. No.: 13/585,437

(22) Filed: Aug. 14, 2012

(65) Prior Publication Data

US 2012/0304408 A1   Dec. 6, 2012

Related U.S. Application Data

(63) Continuation of application No. 12/596,466, filed as application No. PCT/US2008/061884 on Apr. 29, 2008, now Pat. No. 8,241,427.

(60) Provisional application No. 60/915,769, filed on May 3, 2007.

(51) Int. Cl.
*A47L 13/22* (2006.01)
*B25G 1/10* (2006.01)

(52) U.S. Cl.
USPC ........... 401/138; 15/147.1; 15/143.1; 15/228; 401/137; 401/139; 401/140; 401/268; 401/282

(58) Field of Classification Search
USPC ................. 401/48, 138, 139, 140, 268, 282, 401/137; 15/120.2, 143.1, 147.1, 228
See application file for complete search history.

(56) References Cited

U.S. PATENT DOCUMENTS

| 4,265,425 | A | 5/1981 | Morin |
| 4,674,722 | A | 6/1987 | Danby et al. |
| 6,217,244 | B1* | 4/2001 | Chen et al. ............ 401/140 |
| 2003/0089383 | A1* | 5/2003 | Biggs ..................... 134/6 |
| 2006/0280546 | A1* | 12/2006 | Dyer ..................... 401/139 |

FOREIGN PATENT DOCUMENTS

| FR | 2346761 | 2/1975 |
| JP | 51104624 | 9/1976 |
| JP | 2002-68393 | 3/2002 |
| JP | 2002068393 | 3/2002 |
| JP | 2007-054338 | 3/2007 |
| JP | 2007054338 | 8/2007 |
| WO | 2004/021850 | 3/2004 |
| WO | 2004021850 | 3/2004 |

* cited by examiner

*Primary Examiner* — Michael Kornakov
*Assistant Examiner* — Natasha Campbell
(74) *Attorney, Agent, or Firm* — Michael Best & Friedrich LLP

(57) ABSTRACT

A floor tool including a handle, a mop head, and a fluid reservoir. The handle includes first and second opposite ends through which a longitudinal axis of the handle extends. The mop head is coupled to the second end of the handle. The fluid reservoir is coupled to and carried by the handle at a location between the first and second ends of the handle and has a center of mass offset from the longitudinal axis. A portion of the handle is offset from the longitudinal axis more the center of mass of the fluid reservoir. Additionally, the portion of the handle is located between the fluid reservoir and the first end of the handle such that the portion of the handle is located above the fluid reservoir.

25 Claims, 23 Drawing Sheets

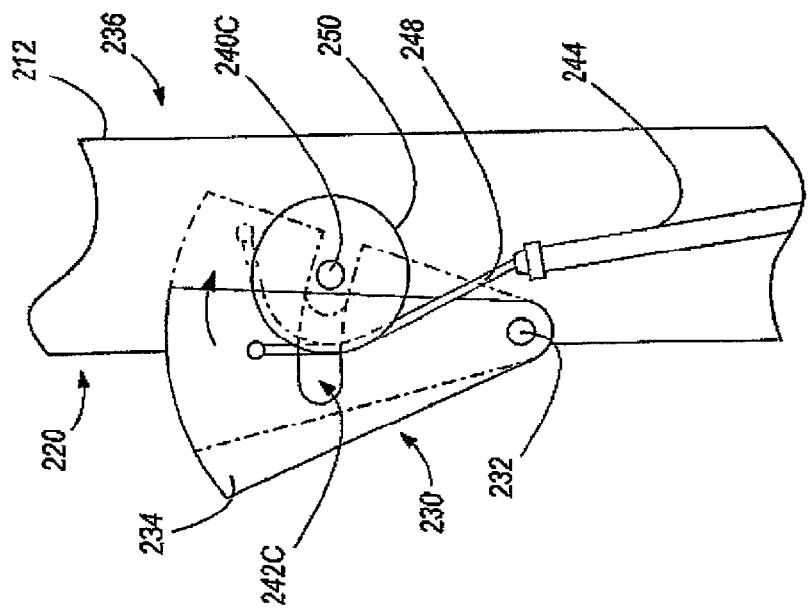
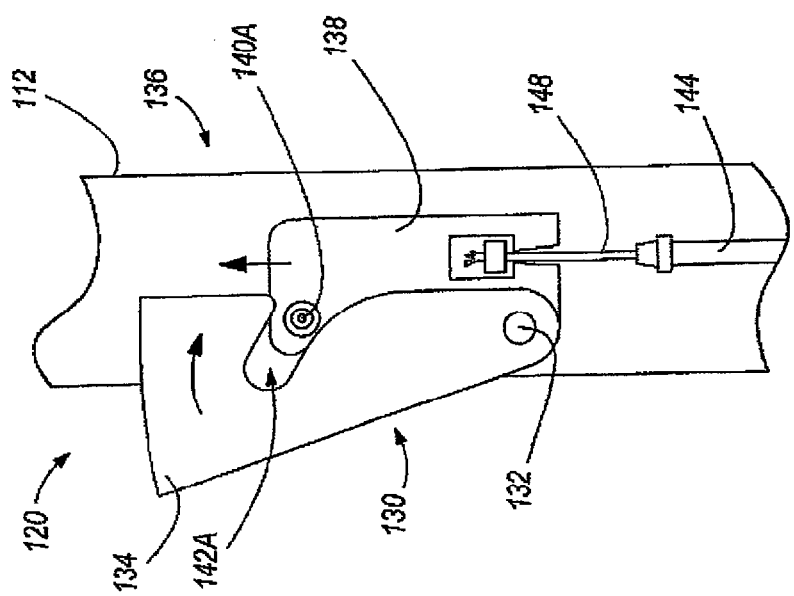

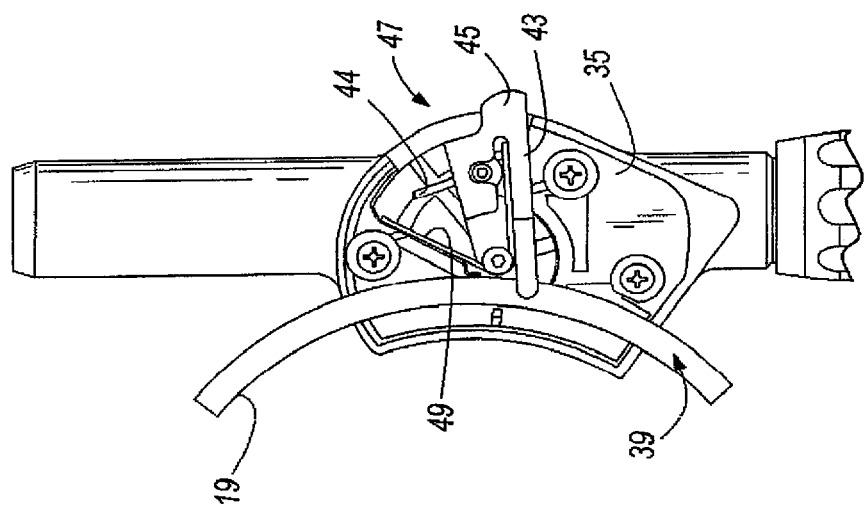
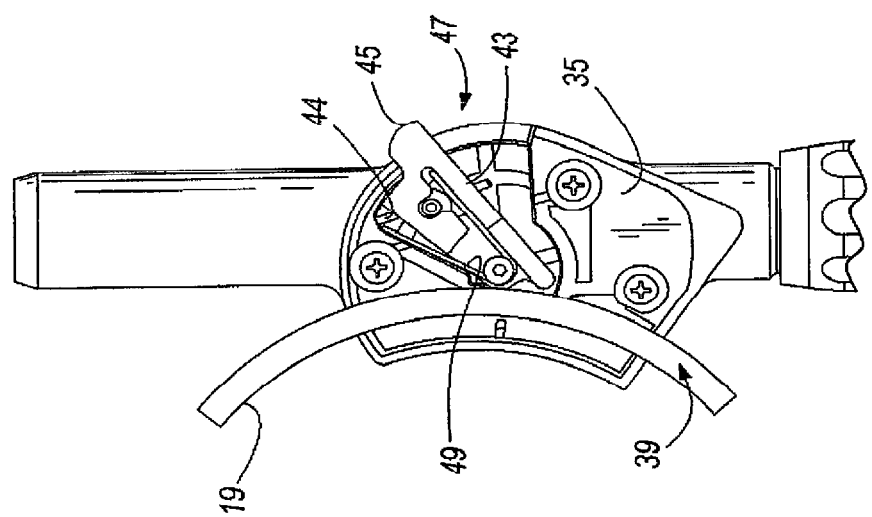

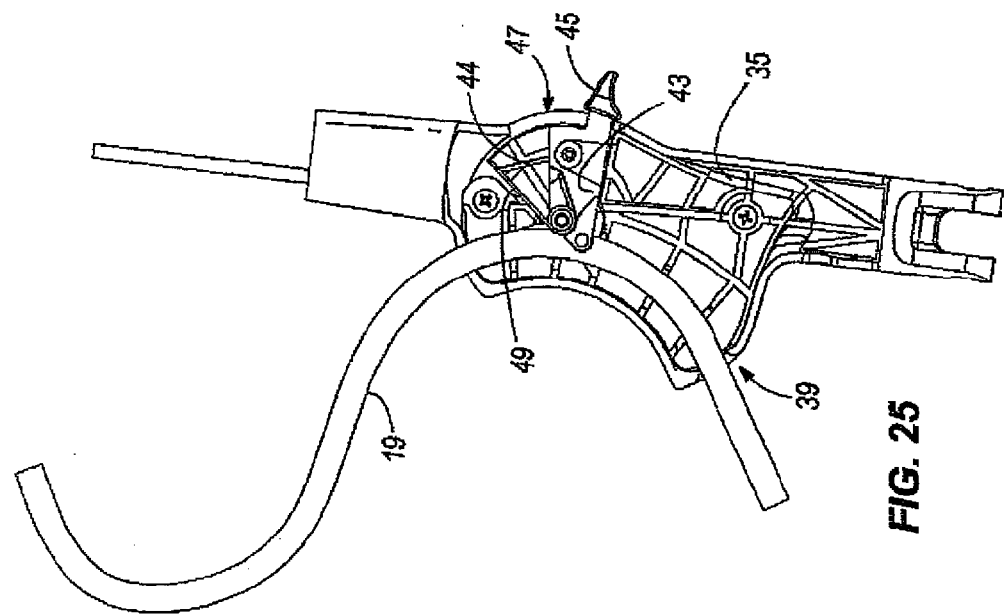
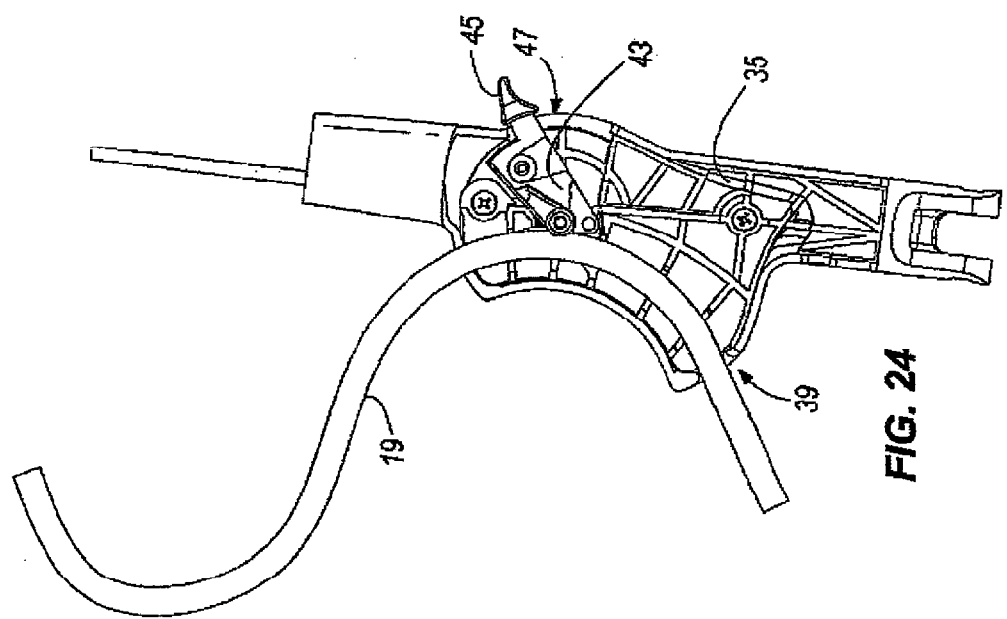

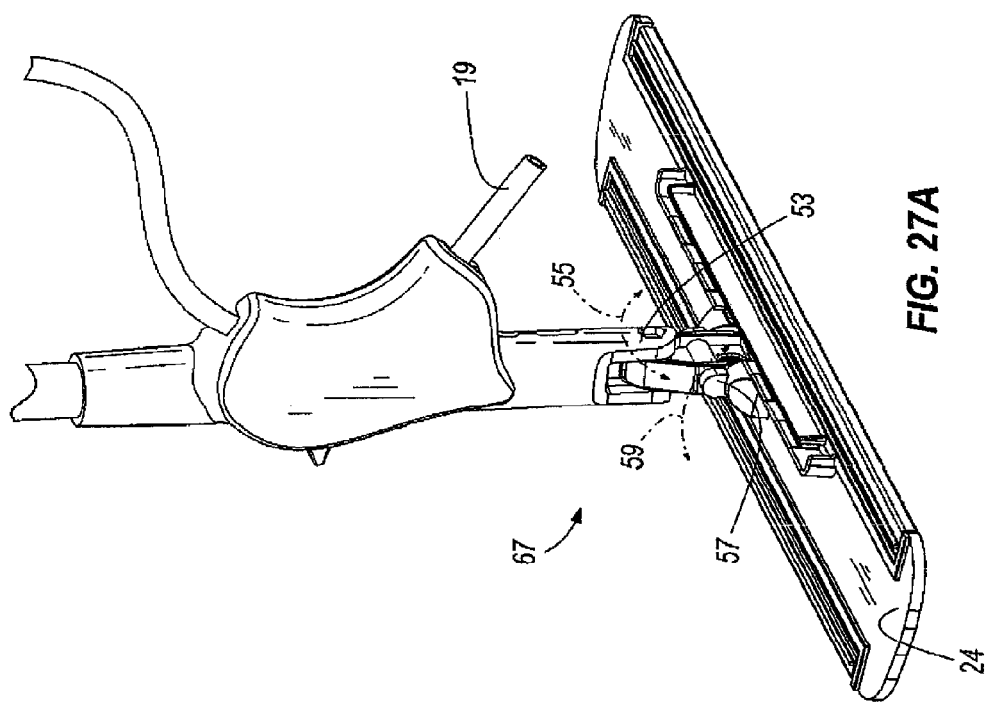

FLOOR MAINTENANCE TOOL AND METHOD

CROSS REFERENCE TO RELATED APPLICATIONS

This application is a continuation of U.S. patent application Ser. No. 12/596,466, filed Oct. 19, 2009, which is a U.S. national phase application filing of International Patent Application No. PCT/US08/61884 filed Apr. 29, 2008, which claims the benefit of and priority to U.S. Provisional Patent Application No. 60/915,769, filed May 3, 2007, the entire contents of each of which are incorporated herein by reference.

BACKGROUND

The present invention relates to a wide variety of floor maintenance tools exist for many applications, including cleaning floor surface, polishing floor surfaces, applying material to floor surfaces, stripping material from floor surfaces, and the like. Although these tools have been known for many years, the vast majority of such tools are not ergonomically designed. In many cases, the lack of attention to ergonomics in the design of floor tools results in greater time and effort needed by a user to perform a task, poorer work quality, and reduced user efficiency. Also, many tasks a user must perform in using a floor tool (e.g., filling cleaning solution reservoirs, dispensing cleaning fluid, rotating and/or translating a head of the floor tool, and the like) are repetitive in nature or are often performed many times over the life of the floor tool. Therefore, an important design parameter for floor tools is the ease with which a user can perform such tasks. Unfortunately, this design parameter is often forgotten or ignored in conventional floor tools.

Accordingly, floor tools that are easy to use, ergonomically designed, and/or increase the efficiency of a user are welcome additions to the art.

SUMMARY

In one embodiment, the invention provides a floor tool includes a handle having first and second opposite ends through which a longitudinal axis of the handle extends, a mop head, and a fluid reservoir. The mop head is coupled at the send end of the handle. The fluid reservoir is coupled to and carried by the handle at a location between the first and second ends of the handle and has a center of mass offset from the longitudinal axis. Further, a portion of the handle is located between the fluid reservoir and the first end of the handle such that the portion of the handle is located above the fluid reservoir. The portion of the handle is also offset from the longitudinal axis more than the center of mass of the fluid reservoir and substantially aligned with the longitudinal axis.

In another embodiment, the invention provides a floor tool includes a handle having first and second opposite ends through which a longitudinal axis of the handle extends, a mop head, and a fluid reservoir. The mop head is coupled at the send end of the handle. The fluid reservoir is coupled to and carried by the handle at a location below a midpoint of the handle and has a center of mass offset from the longitudinal axis. Further, a portion of the handle is located between the fluid reservoir and the first end of the handle such that the portion of the handle is located above the fluid reservoir. The portion of the handle is also offset from the longitudinal axis more than the center of mass of the fluid reservoir.

In another embodiment, the invention provides a floor tool comprising a handle having first and second opposite ends through which a longitudinal axis of the handle extends. The handle includes a first portion and a second portion. The first portion is disposed on a first side of the longitudinal axis and defines a grip, while the second portion is disposed on a second side of the longitudinal axis where the second side is opposite the first side. A mop head is coupled at the second end of the handle. A fluid reservoir is coupled to the second portion Some embodiments of the present invention provide a floor tool comprising a handle having first and second opposite ends through which a longitudinal axis of the handle extends; a mop head coupled at the second end of the handle; a fluid reservoir coupled to and carried by the handle at a location between the first and second ends of the handle; the fluid reservoir having a center of mass offset from the longitudinal axis; and a portion of the handle located between the fluid reservoir and the first end of the handle, wherein the portion of the handle is offset from the longitudinal axis more than center of mass of the fluid reservoir.

In some embodiments, a floor tool is provided, and comprises a handle having a first end and a second end opposite the first end, the handle lying substantially in a plane; a first portion of the handle located at the first end of the handle; a mop head coupled at the second end of the handle; a longitudinal axis extending through and between the first and second ends of the handle; a second portion of the handle offset from the longitudinal axis; a first grip located at the first portion of the handle; a second grip located at the second portion of the handle; and a fluid reservoir coupled to and carried by the handle between the second portion and the second end.

Some embodiments of the present invention provide a method of operating a floor tool, wherein the method comprises grasping an elongated handle at a first end, the handle having a mop head connected thereto at a second end opposite the first end, and a longitudinal axis extending through the first and second ends of the handle; grasping the elongated handle at a location offset from the longitudinal axis and between the first and second ends of the elongated handle; moving the elongated handle to place the mop head in contact with a floor surface; and orbiting a center of mass of a fluid reservoir about the longitudinal axis of the elongated handle and between the mop head and the location.

Some embodiments of the present invention provide an actuator for a floor tool fluid dispenser coupled to a floor tool having an elongated handle with first and second opposite ends, a mop head coupled at the second end of the elongated handle, and a valve operable to control flow of fluid from the floor tool, wherein the actuator comprises a first moving portion rotatably coupled to the handle about an axis and having a trigger extending away from the axis to an end of the first moving portion, wherein the end of the first moving portion is located closer to the first end of the elongated handle than the axis; and a second moving portion responsive to movement of the first moving portion by at least one of opening and closing the valve.

In some embodiments, a floor tool is provided, and comprises an elongated handle with first and second opposite ends; a mop head coupled at the second end of the elongated handle; a valve operable to control flow of fluid from the floor tool; and a trigger coupled to the valve, rotatably coupled to the handle about an axis, and extending away from the axis to an end of the trigger, wherein the end of the trigger is located closer to the first end of the elongated handle than the axis.

Some embodiments of the present invention provide a method of dispensing fluid from a reservoir of a floor tool having first and second opposite ends, and a mop head coupled to the handle at the second end of the handle, wherein the method comprises squeezing a trigger extending from an axis of rotation generally away from the second end of the floor tool; pivoting the trigger about the axis by squeezing the trigger; opening a valve coupled to the trigger by pivoting the trigger; and dispensing fluid from the reservoir.

In some embodiments, a valve for a floor maintenance tool having a conduit through which fluid is dispensed is provided, and comprises a housing coupled to the handle; a first portion; and a second portion disposed a distance from the first portion to define a gap having a width between the first and second portions, the second portion movable with respect to the first portion to change the width of the gap, the gap having an open side permitting lateral insertion of the conduit.

Some embodiments of the present invention provide a valve for a floor maintenance tool having a conduit through which fluid is dispensed, wherein the valve comprises a valve body at least partially defining a channel having opposing sides, a bottom, and a substantially open top extending along a length of the channel; and a lever movable between a first position in which fluid flow through the conduit positioned within the channel is restricted and a second position in which fluid flows though the conduit positioned within the channel.

In some embodiments, a method of controlling fluid flow through a conduit on a floor maintenance device is provided, and comprises inserting the conduit laterally between first and second portions of a valve on the floor maintenance device; pinching the conduit between the first and second portions of the valve to prevent fluid flow through the conduit; and actuating the second portion of the valve to open the conduit and to permit fluid flow through the conduit. Other aspects of the invention will become apparent by consideration of the detailed description and accompanying drawings.

BRIEF DESCRIPTION OF THE DRAWINGS

FIG. 5 is another embodiment of a user-manipulated control according to the present invention.

FIG. 6 is another embodiment of a user-manipulated control according to the present invention.

FIG. 18 is a detail elevational view of the floor tool shown in FIGS. 1 and 14-16, shown with a portion of the valve housing removed and with the valve in an open position.

FIG. 19 is the detail elevational view of the floor tool shown in FIG. 18, shown instead with the valve in a closed position.

FIG. 24 is a detail elevational view of the floor tool shown in FIGS. 1A and 20-22, shown with a portion of the valve housing removed and with the valve in an open position.

FIG. 25 is the detail elevational view of the floor tool shown in FIG. 24, shown instead with the valve in a closed position.

FIG. 27A is a detail perspective view of another portion of the floor tool of FIG. 1A, showing the head and handle-to-head joint of the floor tool.

DETAILED DESCRIPTION

Before any embodiments of the present invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As will be understood from this specification, one or more aspects of the present invention relate to a hand held floor maintenance tool having a handle and a head attached to the handle. Such a tool or components thereof can be used for many different tasks, such as cleaning a surface (e.g., mopping), applying a protective coating on a surface (e.g., waxing), removing a coating from a surface (e.g., stripping), and the like. For the sake of simplicity, the floor maintenance tool described herein will be referenced with respect to a commonly used term: "mop." However, it is to be understood that this term is not intended to limit the function of the devices or methods described and claimed herein, unless otherwise specified. Rather, this term is used for the sake of simplicity when describing and claiming the various embodiments of the present invention. As used herein and in the appended claims, the term "mop" encompasses not only floor cleaning operations and devices, but also other floor maintenance operations, including without limitation waxing, stripping, buffing, and the like. Furthermore, components described herein having the term "mop" in the component name (e.g., "mop head", "mop pad", and the like) are not to be interpreted as being limited in application to cleaning operations.

Figure 1A:
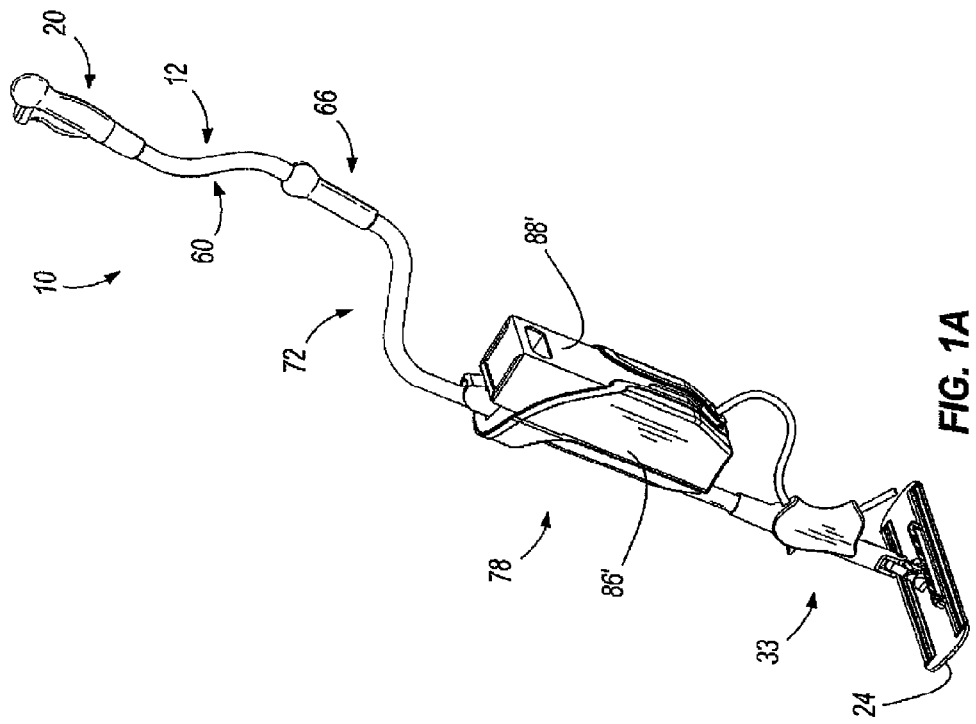
FIG. 1A is a perspective view of a floor tool according to another embodiment of the present invention, shown in an operating position.
Figure 1:
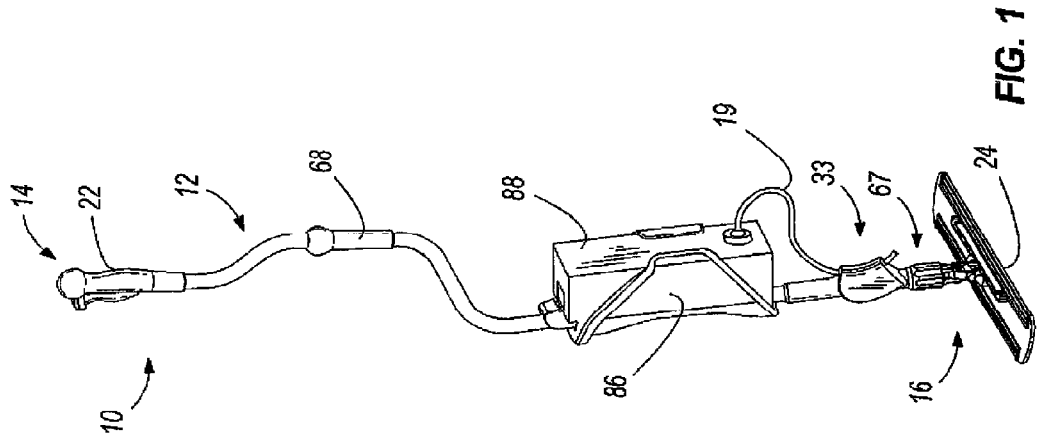
FIG. 1 is a perspective view of a floor tool according to an embodiment of the invention.

A mop according to an embodiment of the present invention is illustrated in FIG. 1. The mop 10 includes a handle 12 extending generally along the longitudinal length of the mop 10. The handle 12 has a generally serpentine or auger shape. As used herein, the term "serpentine" or "auger" refers to an undulating shape that need not necessarily be symmetrical or regular, and can have any number of undulations of the same or different amplitudes and lengths. Also, each wave of the undulating shape can be symmetrical or asymmetrical in length and amplitude. Furthermore, although the inventors have discovered that a handle 12 lying entirely or substantially entirely in a single plane provides good performance results, the handle 12 can lie in two or more planes in other embodiments. In this regard, one or more undulations can lie in planes that are different from those in which one or more other undulations lie. Similarly, a single undulation can lie substantially entirely in a single plane, or can lie in more than one plane (i.e., portions of the undulation being skewed with respect to one another).

Figure 1B:
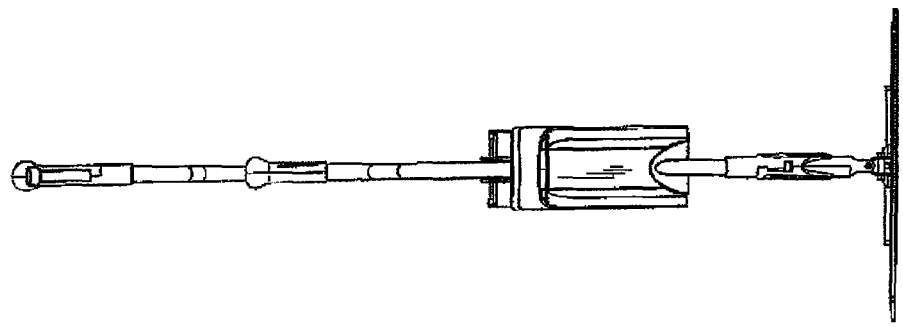
FIG. 1B is a side elevational view of the floor tool of FIG. 1A.

The handle 12 shown in FIG. 1 includes a first end 14 and a second end 16 opposite the first end 14. The second end 16 is coupled to a mop head 24, and the first end 14 includes a portion that can be gripped by a user to move the mop head 24 along a floor or other surface. As best shown in FIGS. 1 and 1B, a longitudinal axis 18 extends between and through the first and second ends 14, 16 of the handle 12. In the illustrated embodiments and other embodiments, the longitudinal axis 18 is a straight line extending through points defining the length of the handle 12. Also, in the illustrated embodiments and other embodiments, the longitudinal axis 18 is a straight line extending through a radially central location defined by the connection between the mop head 24 and the handle 12, and through a radially central location defined by the place where a user grips the handle 12 of the mop 10 at an end opposite the mop head 24 in normal operation of the mop 10. In some embodiments, the longitudinal axis is defined as the axis of rotation of the handle 12 during use (for example where the first end of the handle has an element extending substantially out of the axis of rotation).

In some embodiments, at least a majority of the serpentine handle 12 (measured along a straight line parallel to the longitudinal axis 18) does not intersect the longitudinal axis 18. For example, in the embodiment illustrated in FIGS. 1B-1E, approximately only about 16% of the handle intersects or lies on the longitudinal axis. However, in some embodiments, at least seventy percent of the serpentine handle 12 (measured along a straight line parallel to the longitudinal axis 18) does not intersect the longitudinal axis 18. In still other embodiments, at least eighty percent of the serpentine handle 12 (measured along a straight line parallel to the longitudinal axis 18) does not intersect the longitudinal axis 18. With reference to the illustrated embodiments of FIGS. 1-1E, the handle 10 begins and ends at the longitudinal axis 18, and crosses the longitudinal axis 18 at one location therebetween.

Figure 1C:
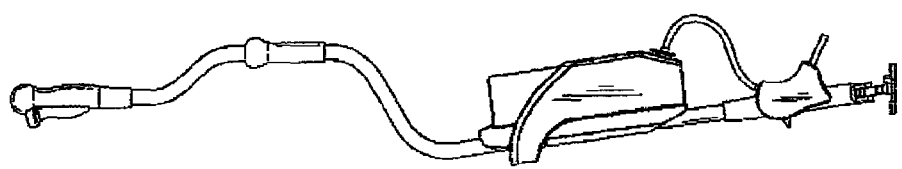
FIG. 1C is a front elevational view of the floor tool of FIG. 1A.
Figure 1D:
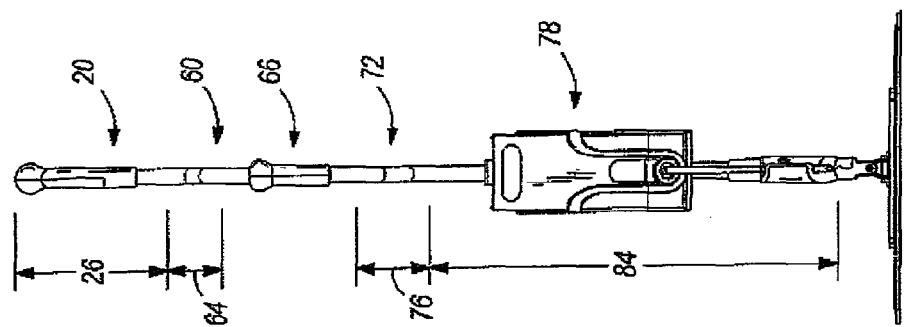
FIG. 1D is an opposite side elevational view of the floor tool of FIG. 1A.
Figure 1E:
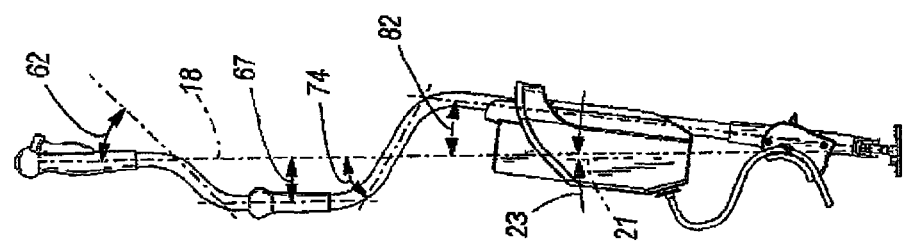
FIG. 1E is a rear elevational view of the floor tool of FIG. 1A.

The handle 12 in the illustrated embodiments of FIGS. 1-1C lies in a single plane (e.g., see FIGS. 1C and 1E). However, as described above, one or more portions of the handle 12 can lie outside of the plane. For example, in some embodiments, at least a majority of the serpentine handle 12 (measured along a straight line parallel to the longitudinal axis) lies within the plane. In other embodiments, at least seventy-five per-cent of the handle 12 lies within the plane.

The mop 10 shown in FIGS. 1 and 1B-E is generally oriented as illustrated in FIG. 1A while in operation. The handle 12 of the mop 10 in the illustrated embodiments has a first generally straight portion 20 defining an end of the mop handle 12. This first portion 20 defines a location at which a user of the mop 10 can grasp the handle 12 with one hand when using the mop 10, or against which the user can exert pressure with one of the user's hands when using the mop 10. In the illustrated embodiments, the first portion 20 is provided with a grip 22 having a curved shape adapted for grasping by a user's hand and for at least partially conforming to the shape of the user's palm, and having a rounded terminal end adapted for engagement by a user's palm during operation of the mop 10.

The first portion 20 of the handle 12 illustrated in the embodiments of FIGS. 1-1E lies generally on and is parallel to the longitudinal axis 18. However, in other embodiments, the first portion 20 can be oriented with respect to the longitudinal axis 18 at an angle of no greater than about 30 degrees. In other embodiments, this angle is no greater than about 20 degrees. In still other embodiments, this angle is no greater than about 10 degrees.

In some embodiments, the first portion length 26 (measured along a straight line parallel to the longitudinal axis 18) is at least about 5 inches and is no greater than about 20 inches. In other embodiments, this length 26 is no greater than about 15 inches and is no less than about 8 inches. In still other embodiments, a length 26 of no greater than about 12 inches and no less than about 10 inches.

As illustrated, a grip 26 is coupled to the first portion 30 of the handle 12. The grip 26 length (measured along a straight line parallel to the longitudinal axis 18) is at least about 3 inches and is no greater than about 20 inches. In other embodiments, this length is no greater than about 13 inches and is no less than about 5 inches. In still other embodiments, a length 26 of no greater than about 10 inches and no less than about 8 inches.

Figure 3:
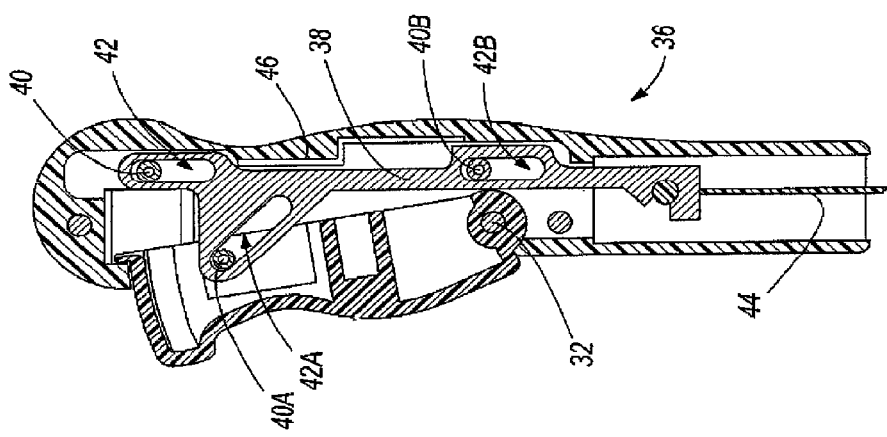
FIG. 3 is a cross-sectional view of the floor tool shown in FIGS. 1 and 2, showing the user-manipulated control in a first position.
Figure 2:
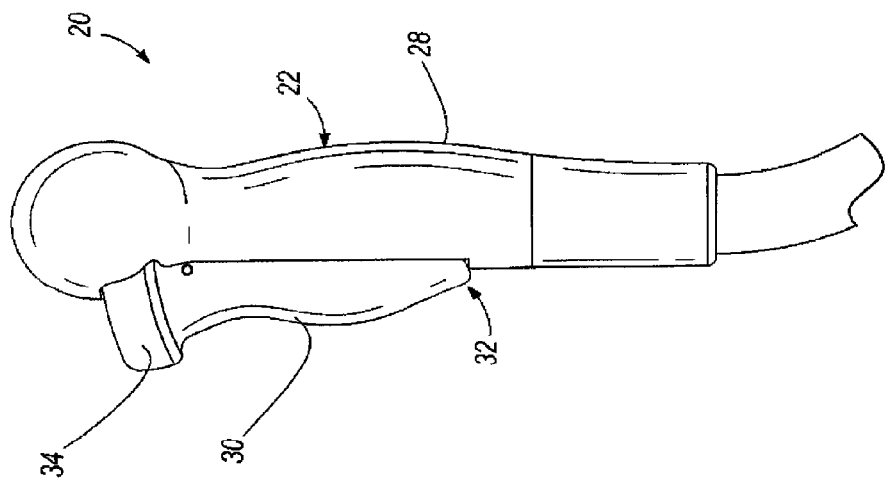
FIG. 2 is a detail perspective view of a first portion of the floor tool illustrated in FIG. 1, showing the user-manipulated control.
Figure 4:
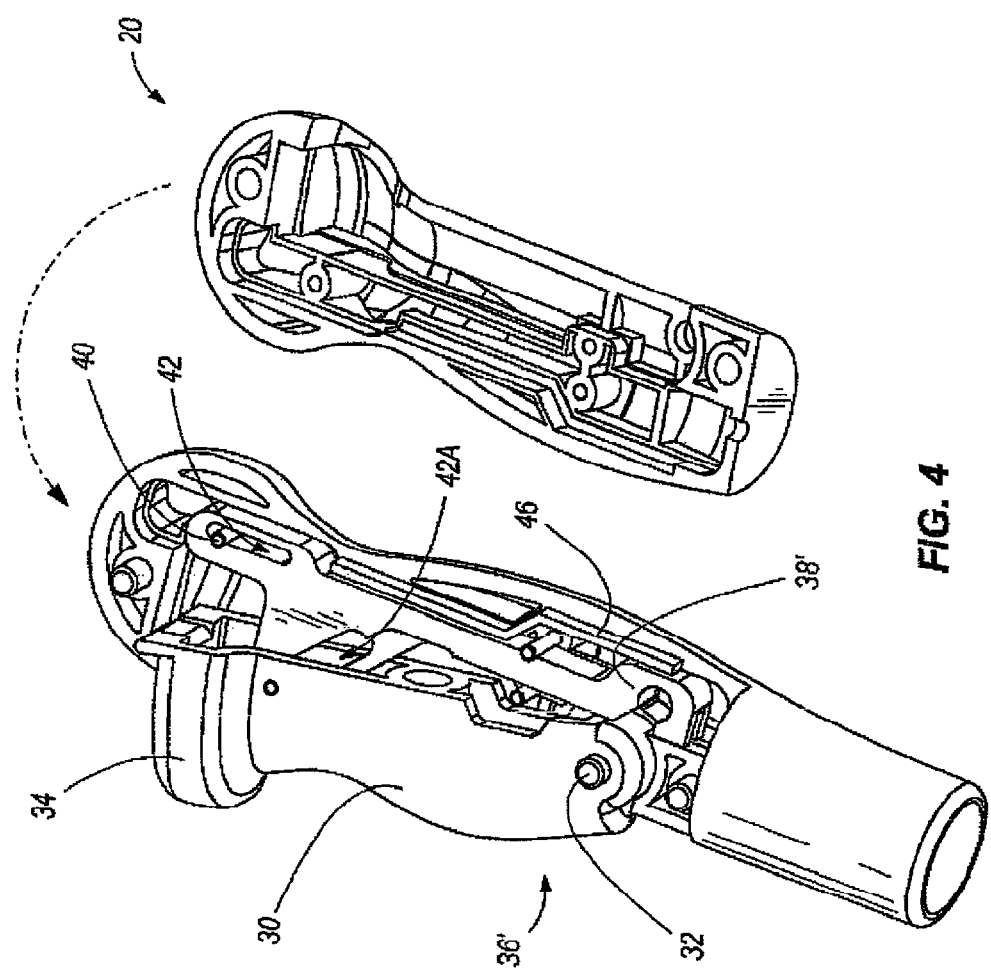
FIG. 4 is a cross-sectional view of another embodiment of the user-manipulated control shown in FIGS. 2 and 3.

The grip 22 illustrated in each of the embodiments shown in FIGS. 1-1E includes a portion 30 that is pivotable about an axis. In some embodiments, this portion 30 defines a trigger 34 that can be pivoted by a user to dispense fluid for floor maintenance operations performed by the mop 10 as will be described in greater detail below. As shown in FIGS. 2-4, the trigger 34 can be pivotable about an axis 32, which can be defined by a pivot pin (as shown in the illustrated embodiments) or by any other suitable element of the trigger 34 or other grip portion. In some embodiments, the trigger 34 extends away from the pivot point 32 located closer to the mop second end 16 than an end of the trigger opposite the pivot point 32. Described in another manner, the trigger 34 can pivot about an axis 32 positioned between the second end 16 of the mop 10 and the distal end of the trigger 34. A user can squeeze the trigger 34 (e.g., in a direction toward the rest of the grip 22) with his or her hand. In some embodiments, the trigger 34 is operated by a user placing his or her thumb upon the trigger 34, placing one or more other fingers on an opposite side of the grip 22, and squeezing. At those times of mop operation when fluid dispense is not needed, the user can place the palm of his or her hand upon the top of the grip 22, which can be rounded (as described earlier) to facilitate improved movement of the mop 10.

With reference now to FIG. 3, movement of the trigger 34 as described above generates movement of a control element 36 generally contained within or otherwise connected to the first portion 20 of the handle 12. In some embodiments, the control element 36 is a slide, pulley, roller, lever, or other element movable with respect to the first portion 20. For example, the control element 36 illustrated in FIG. 3 is a slide 38 responsive to rotation of the trigger 34 by moving in a general direction toward and away from a valve 33 of the mop 10 (described in greater detail below). Motive force can be transmitted from rotation of the trigger 34 to such movement of the slide 38 in a number of different manners. In some embodiments, this force is transmitted by camming a portion of the trigger 34 against a portion of the slide 38. In other embodiments, this force is transmitted by rolling a portion of the trigger 34 or slide 38 along a portion of the slide 38 or trigger 34, respectively. Still other manners of moving the slide 38 by pivoting the trigger 34 are possible, and fall within the spirit and scope of the present invention.

An example of the manner in which pivoting motion of the trigger 34 can be used to generate sliding motion of a slide is shown in FIG. 3. In this embodiment, a projection of or connected to the trigger 34 is received within an aperture 42A of the slide 38, and moves along an internal surface of the aperture 42A to move the slide 38. The projection shown in FIG. 3 is a pin and bushing set 40A, although in other embodiments a bushing is not used. A bushing can be used to reduce friction between the trigger 34 and slide 38, and in some embodiments can be rotatable about the pin in order to further reduce such friction. The aperture 42A can have any size and shape capable of permitting movement of the pin and bushing set 40A therein as the trigger 34 is squeezed, and in some embodiments is an elongated slot. Alternatively, the pin and bushing set 40A can be positioned adjacent an exterior (peripheral) surface of the slide 38, and can move therealong to impart motive force from the trigger 34 to the slide 38 as the trigger 34 is squeezed. In still other embodiments, the locations of the pin and bushing set 40A and the aperture 42A are reversed (i.e., the pin and bushing set 40A instead being located on the slide 38, and the aperture 42A being defined in the trigger 24) while still performing the same force transmitting function described above.

In some embodiments, movement of the slide 38 is controlled by one or more elements of the slide 38 or grip 22 camming or rolling upon surfaces of the grip 22 or slide 38, respectively. This control can help stabilize movement of the slide 38, and can prevent the slide 38 from binding or otherwise moving in undesirable manners. For example, the slide 38 illustrated in FIG. 3 has first and second spaced apertures 42, 42B, each of which receives a respective projection (i.e., pin and bushing sets 40, 40B) connected to the grip 22. The apertures 42, 42B can have any size and shape capable of permitting movement of the pin and bushing sets 40, 40B therein as the trigger 34 is squeezed, and in some embodiments are elongated slots. In other embodiments, either or both of these projections can instead roll or cam along exterior (peripheral) surfaces of the slide 38. Also, in other embodiments the locations of either or both pin and bushing sets 40, 40B and apertures 42, 42B can be reversed (e.g., pin and bushing sets 40, 40B mounted on the slide 38 and extending into apertures 42, 42B of the grip 22).

The slide 38 illustrated in FIG. 3 is connected to a cable 44 connecting the slide 38 to the valve 33 (described in greater detail below) for remote actuation of the valve 33. Therefore, by moving the slide 38 as described above, the slide 38 pushes and/or pulls the cable 44, which in turn actuates the valve 33. The slide 38 illustrated in FIG. 3 is connected to the cable 44 by a cable end fitting, although this connection can be established in any other suitable manner. In other embodiments, the slide 38 is connected to and actuates the valve 33 in other manners, such as by one or more bars, rods, or other linkages extending between the slide 38 and valve 33, one or more hydraulic lines transmitting hydraulic or pneumatic pressure therealong, a cord, wire, rope, or other flexible elongated element, and the like. Additionally, electrical devices can also be used to cause actuation. For example, electrical switches triggering solenoid valves, peristaltic pumps, and the like can be utilized in some embodiments.

Figure 4A:
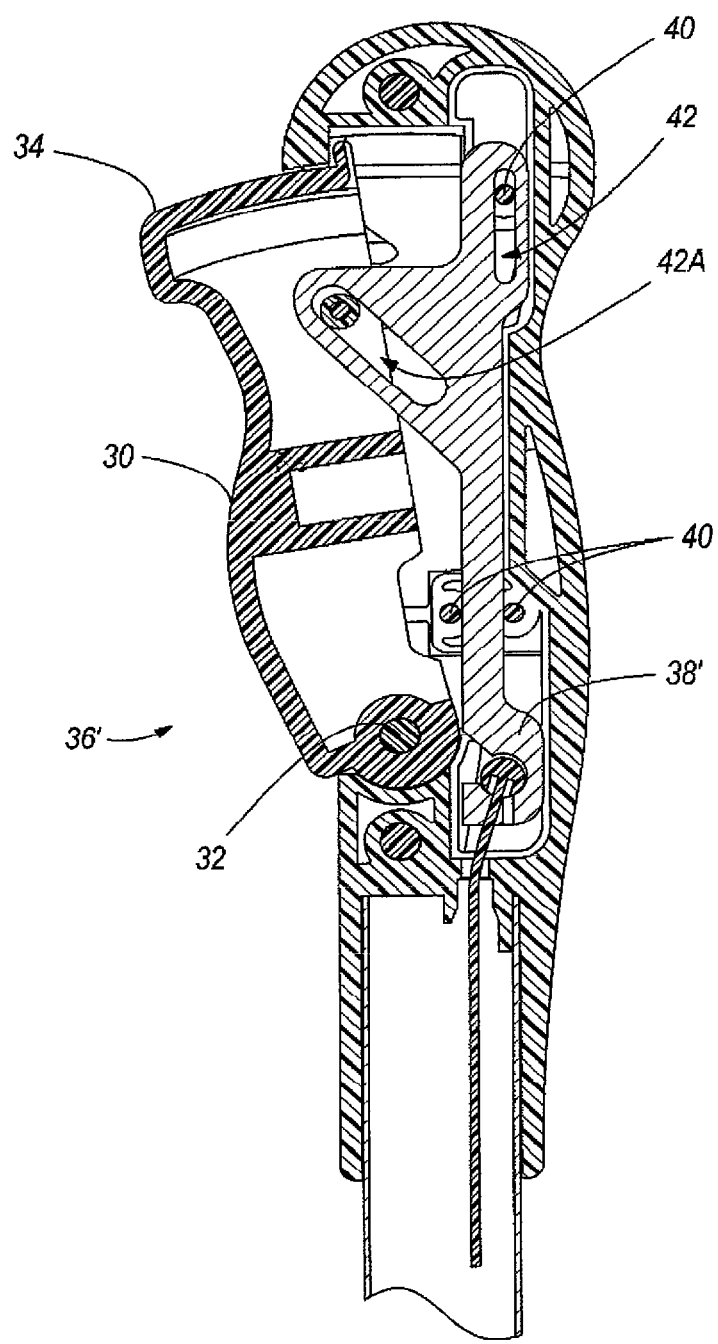
FIG. 4A is a cross-sectional view of another embodiment of the user-manipulated control shown in FIG. 4.

As alternatives to the embodiment shown in FIG. 3, the slide 38 can have fewer or more than three apertures for transmission of power from the trigger 34 to the cable 44 and for stabilized movement of the slide 38 as described above. For example, the illustrated embodiments of FIGS. 4 and 4A utilize only two apertures, in which case only one aperture 42 is used to stabilize movement of the slide 38 with respect to the grip 22. The slide 38 shown in FIG. 4 is shorter than that shown in FIG. 4, and has movement determined by two pin and bushing sets 40, 40A (only one of which is visible in FIG. 4) received within respective apertures 42, 42A in the slide 38. Further movement stability is provided by boss elements positioned generally beside the slide 38. These boss elements can be ribs 46 on the grip 22, can be connected to the grip 22 or molded or otherwise formed on the grip 22, can have any shape and size suitable for guiding movement of the slide 38 (e.g., pegs, pins (FIG. 4A), walls, ribs, bumps, and the like), and can be used in any of the embodiments disclosed herein. Like the illustrated embodiment of FIGS. 2 and 3 described above, the triggers 34 illustrated in FIGS. 4 and 4A are pivotable about an axis 32 positioned closer to the second end 16 of the handle 12 than the terminal end of the trigger 34 pressed by a user.

FIGS. 5-8 illustrate alternative control element embodiments according to different embodiments of the present invention. Accordingly, with the exception of mutually inconsistent features and elements between the embodiments of FIGS. 5-8 and the embodiments of FIGS. 3 and 4, reference is hereby made to the description above accompanying the embodiments of FIGS. 3 and 4 for a more complete description of the features and elements (and the alternatives to the features and elements) of the embodiments of FIG. 5-8. Features and elements in the embodiment of FIGS. 5-8 corresponding to features and elements in the embodiments of FIGS. 3 and 4 are numbered in respective hundreds series of reference numbers (e.g., 112, 212, 312, and the like).

Some embodiments of the grip 22 employ a slide 38 connected to a trigger 34 in any of the manners described above, but whose movement is otherwise controlled by the relative shapes of the slide 38 and grip 22 rather than by a projection and aperture relationship as also described above. Also, the control element 136 shown in FIG. 5 includes a slide 138 carrying a pin and bushing set 140A (rather than a pin and bushing set carried by the trigger as described in connection with FIG. 3). An aperture 142A defined in the trigger 134 receives the pin and bushing set 140A, and extends in a diagonal direction with respect to the direction of movement of the slide 138 in order to generate movement of the slide 138 described above in connection with FIG. 3.

In some embodiments, the trigger imparts motive force to a control element that does not slide, but instead rotates for actuation of the cable (or other element connected to the valve 33). For example, the control element 236 illustrated in FIG. 6 is a pulley 250 connected to and rotatable with a pin and bushing set 240C, although the pin and bushing set 240C can instead be replaced by a pin or other projection. The pin and bushing set 240C moves along an aperture 242C defined in the trigger 234 as the trigger 234 is squeezed. The aperture 242C shown in FIG. 6 is arcuate in shape to permit free movement of the pin and bushing set 240C therein, although any other aperture shape and size capable of permitting such movement can instead be used as desired. The cable 248 is connected to the trigger 234, and is pulled and at least partially wrapped about the pulley 250 when the trigger 234 is squeezed, thereby causing actuation of the cable 248. However, in other embodiments, other elements connecting the valve 33 to the trigger 234 (described above) can be connected for similar actuation by the trigger 234.

With continued reference to FIG. 6, the pulley 250 can have any size and shape suitable for drawing the cable 248 thereabout when the trigger 234 is squeezed. For example, the pulley 250 can be generally round (e.g., see FIG. 6), oval, semi-circular, or irregular in shape. Also, although the pulley 250 is rotatable with the bushing of the pin and bushing set 240C shown in FIG. 6, in other embodiments the pulley 250 is not rotatable. In some embodiments, the pin and bushing set 240C is shaped for mating engagement with an interior surface of the aperture 242C, such as by gear teeth on the pin and bushing set 240C and on the interior surface of the aperture 242C. This engagement can provide more controlled rotation of the pulley 250 when the trigger 234 is squeezed.

Figure 7:
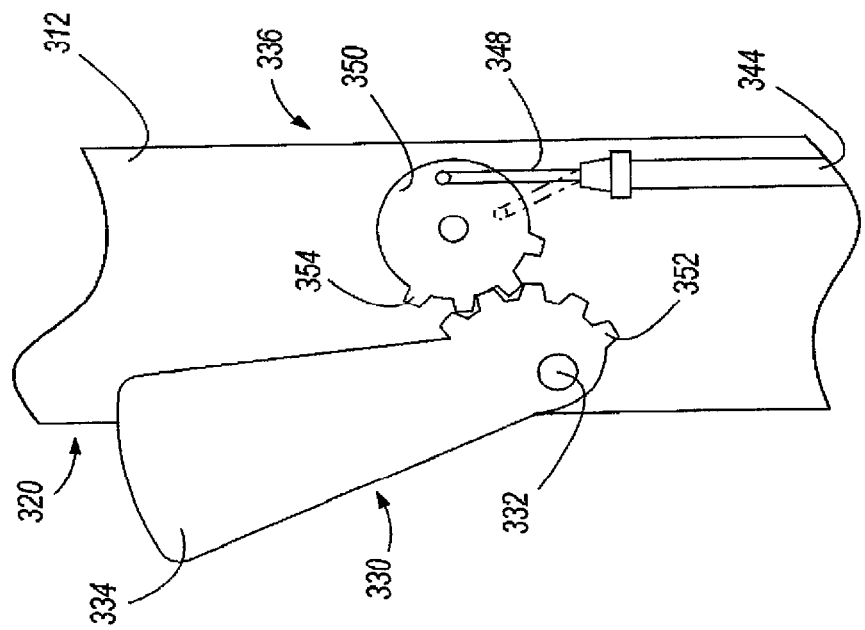
FIG. 7 is another embodiment of a user-manipulated control according to the present invention.

Other embodiments of the control element 336 include teeth 352 on the trigger 334 that engage teeth 354 on the control element 336, which can take the form of a gear 350. An example of such an embodiment is shown in FIG. 7. Although four teeth are illustrated on the trigger 334 and on the gear 350, other numbers of teeth on either or both of these elements are utilized in other embodiments. Like the other embodiments described above, the trigger 334 shown in FIG. 7 pivots about an axis 332 positioned between the second end 16 of the mop 10 and a distal end of the trigger 34 squeezed by a user. As the trigger 334 is squeezed, the gear 350 is rotated. A first end of the cable 348 (or other linkage as described above) coupled to the gear 350 at a eccentric location of the gear 350 is pulled or pushed by the gear 350 as the gear 350 rotates, thereby actuating the valve 33 described below.

Figure 8:
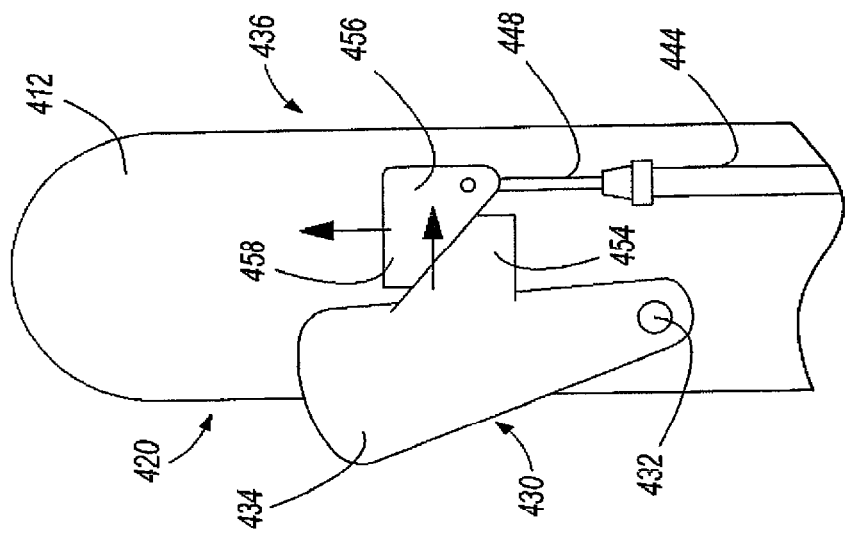
FIG. 8 is yet another embodiment of a user-manipulated control according to the present invention.

Still other embodiments of the control element 436 include one or more camming surfaces positioned at an incline with respect to the direction of travel of one or more camming surfaces of the trigger 434 when the trigger 434 is squeezed. An example of such a control element 435 is shown in FIG. 8. As with the illustrated embodiments described above, the trigger 434 is pivotable about an axis 432 positioned between the second end 16 of the mop 10 and the distal end of the trigger 434 squeezed by the user. The trigger 434 includes an inclined surface or ramp 454 that extends toward and into engagement with a mating inclined surface or ramp 456 of a slide 438 (which can have any of the features described above that are not inconsistent with this trigger-to-slide relationship). As the trigger 434 is squeezed or released by a user, the ramps 454, 456 slide along one another to move the slide 438 generally away from or toward the valve 33, thereby pulling or pushing a cable 448 connected to the slide 438 to actuate the valve 33.

With reference back to FIGS. 1, 1B, and 1C, a second portion 60 of the handle 12 illustrated in these figures extends away from the first portion 26, and also extends away from the longitudinal axis 18 at an angle 62. The second portion 60 of the handle 12 extends to a third portion 66 that provides a second grip for a user of the mop 10, as will be described in greater detail below. In some embodiments, at least part of the second portion 60 (e.g., a middle part) is substantially straight, and defines the angle 62 with respect to the longitudinal axis 18. In some embodiments, this angle 62 is no less than about 15 degrees and is no greater than about 75 degrees. In other embodiments, this angle 62 is no less than about 30 degrees and is no greater than about 60 degrees. In still other embodiments, this angle 62 is no less than about 40 degrees and is no greater than about 50 degrees.

The second portion length 64 (measured along a straight line parallel to the longitudinal axis 18) is at least about 1 inch and no greater than about 8 inches in some embodiments. In other embodiments, this length 64 is no greater than about 6 inches and is no less than about 2 inches. In still other embodiments, a length 64 of no greater than about 4.5 inches and no less than about 3 inches is used.

As described above, the third portion 66 of the handle 12 illustrated in FIGS. 1, 1B, and 1C provides a location for grasping by a second hand of the user (the first hand grasping the grip 22 described above). In the illustrated embodiment of FIGS. 1, 1B, and 1C, the third portion 66 extends away from the second portion 60 in a direction that is offset but substantially parallel to the first portion 26. However, in other embodiments, the third portion 66 is oriented with respect to the longitudinal axis 18 at an angle of no greater than about 30 degrees. In other embodiments, this angle is no greater than about 20 degrees. In still other embodiments, this angle is no greater than about 10 degrees.

The third portion 66 is generally offset from the longitudinal axis 18 of the handle 12 to provide a user with mechanical advantage to exert torque upon the handle 12, thereby pivoting the mop 10. The third portion 66 can be offset from the longitudinal axis by a greater amount than an offset of a center of mass of a fluid container 88, 88', 88" described in greater detail below. In the illustrated embodiment, the offset is about 3 inches. However, in some embodiments, the offset 67 is at least about 1 inch, and is no greater than about 7 inches. In other embodiments, this offset 67 is at least about 2 inches, and is no greater than about 5 inches. In still other embodiments, this offset 67 is at least about 2.5 inches, and is no greater than about 3.5 inches.

In some embodiments, the third portion length (measured along a straight line parallel to the longitudinal axis 18) is at least about 4 inches and is no greater than about 16 inches. In other embodiments, this length is no greater than about 12 inches and is no less than about 6 inches. In still other embodiments, a third portion length of no greater than about 10.5 inches and no less than about 8 inches is used.

Figure 9A:
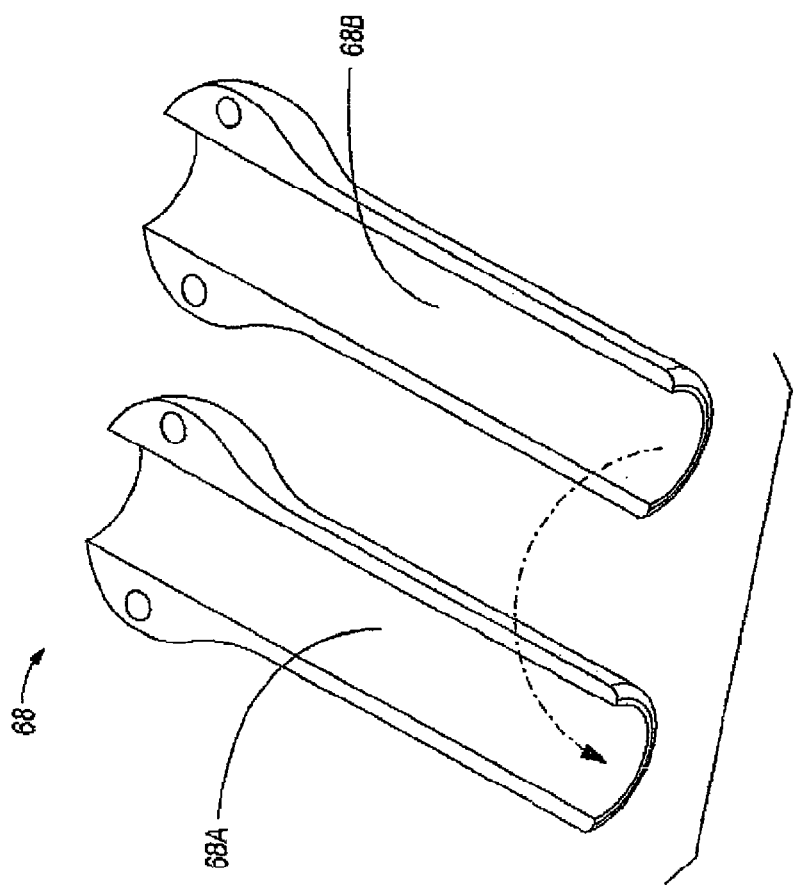
FIG. 9A is an exploded perspective view of the grip shown in FIGS. 1 and 9.
Figure 9:
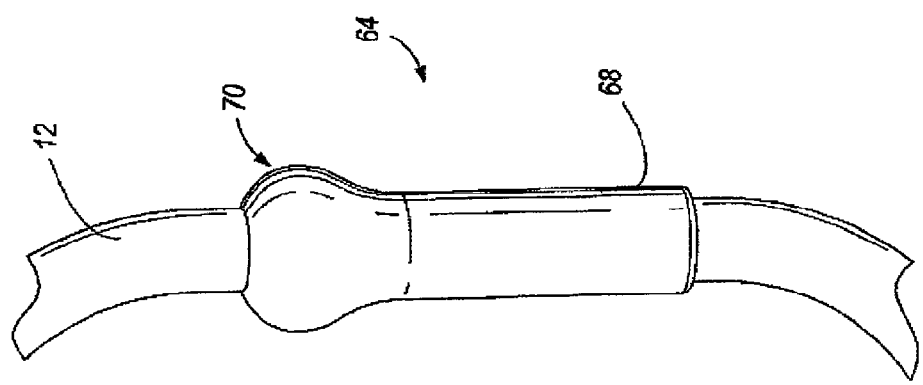
FIG. 9 is a detail perspective view of a grip portion of the floor tool of FIG. 1.

In some embodiments, the third portion 66 includes a second grip 68 for grasping by a user. An example of a second grip 68 is shown in FIGS. 9 and 9A. The second grip 68 can have a larger diameter than the handle 12. An upper portion of the second grip 68 illustrated in FIGS. 9 and 9A includes a bulge 70 with a larger diameter than the rest of the grip 68. This shape of the second grip 68 can provide improved gripping surfaces for the user. In some embodiments, any portion or all of the second grip 68 can include a rough texture or other similar high friction surface to ease gripping by an operator. Also or alternatively, the second grip 68 can include circumferential ridges, bumps, or other protuberances or recesses for generally matching the fingers of a user. Other shapes and textures on the second grip 68 are possible to facilitate gripping by an operator, and are considered to be within the spirit and scope of the present invention.

The second grip 68 can be integral with the handle 12 or can be a separate part attached to the handle 12 in any suitable manner. In those embodiments in which the second grip is a separate part attached to the handle 12, the second grip 68 can be a single piece slid down the handle to the desired location during fabrication of the handle 12. Alternatively, the second grip 68 can be constructed of multiple pieces coupled together in any suitable manner, such as by screws, bolts, pins, rivets, nails, brads, staples, clamps, clasps, and other fasteners, inter-engaging elements, and the like. For example, the second grip 68 illustrated in FIGS. 9 and 9A includes two halves 68A, 68B coupled to one another about the handle 12 by screws (not shown). The second grip 68 in the embodiment of FIGS. 9 and 9A is non-rotatable with respect to the handle 12, although in other embodiments the second grip 68 is rotatable with respect to the handle 12.

With reference again to FIGS. 1, 1B, and 1C, a fourth portion 72 of the handle 12 illustrated in these figures extends away from the third portion 66 of the handle 12 and crosses the longitudinal axis 18. The illustrated fourth portion 72 extends to a fifth portion 78 of the handle 12 located generally on an opposite side of the longitudinal axis 18. In some embodiments, at least part of the fourth portion 72 (e.g., a middle part) is substantially straight, and defines an angle 74 with respect to the longitudinal axis 18. In some embodiments, this angle 74 is no less than about 30 degrees and is no greater than about 75 degrees. In other embodiments, this angle 74 is no less than about 40 degrees and is no greater than about 70 degrees. In still other embodiments, this angle 74 is no less than about 50 degrees and is no greater than about 60 degrees.

In some embodiments, a fourth portion length 76 (measured along a straight line parallel to the longitudinal axis 18) of at least about 2 inches and no greater than about 16 inches is used. In other embodiments, this length 76 is no greater than about 12 inches and is no less than about 3 inches. In still other embodiments, a length 76 of no greater than about 8 inches and no less than about 4 inches is used.

The fifth portion 78 of the mop handle 12 illustrated in FIGS. 1, 1B, and 1C extends to and between the fourth portion 72 and a mop head 24, and provides a mounting location for a fluid reservoir (hereinafter referred to as a container 88), described in greater detail below. In some embodiments, the fifth portion 78 is generally straight, although the fifth portion 78 can have other shapes in other embodiments. The fifth portion 78 of the mop handle 12 illustrated in FIGS. 1, 1B, and 1C extends at an angle 82 with respect to the longitudinal axis 18. As illustrated, the angle 82 is about 7.5 degrees. In some embodiments, this angle 82 is no less than about 5 degrees and is no greater than about 20 degrees. In other embodiments, this angle 82 is no less than about 6 degrees and is no greater than about 15 degrees. In still other embodiments, this angle 82 is no less than about 7 degrees and is no greater than about 10 degrees.

In the illustrated embodiment, the fifth portion length 84 (measured along a straight line parallel to the longitudinal axis 18) is about 22.5 inches. However, in some embodiments, this length is at least about 18 inches and is no greater than about 35 inches in some embodiments. In other embodiments, this length 84 is no greater than about 32 inches and is no less than about 20 inches. In still other embodiments, a length 84 of no greater than about 30 inches and no less than about 22 inches is used.

In some embodiments, the mop 10 includes a holster 86 for holding a fluid container 88. As used here and in the appended claims, the term "holster" refers to any element or device capable of supporting or adapted to support a quantity of fluid retained in a box, bag, bottle, tub, or other suitable container. Examples of such containers 88, 88', 88" are shown in FIGS. 11-13A. The illustrated containers 88, 88', 88" each include a spout 17 and a length of conduit 19 extending therefrom. The conduit 19 permits flow of material from the container 88, 88', 88". Such material can take any flowable form, such as liquid, powder, or slurries.

The holster 86, 86', 86" can be made of any material capable of performing this function, including plastic, metal, and composite materials. In some embodiments, the holster 86, 86', 86" substantially entirely surrounds the container, whereas in other embodiments, the holster 86, 86', 86" only partially surrounds of the container. The holster 86, 86', 86" can be any size and shape suitable for supporting the container of fluid. In the illustrated embodiments of FIG. 11-13, the holster 86, 86', 86" is shaped to hold a generally cuboid container, such as a "bag-in-box" or other generally rectangular container 88, 88', 88". Unlike the containers 88 illustrated in FIGS. 11, 11A, 12, and 13, the containers 88', 88" illustrated in FIGS. 11B, 12B, and 13B each have a tapered lower portion.

Figure 11:
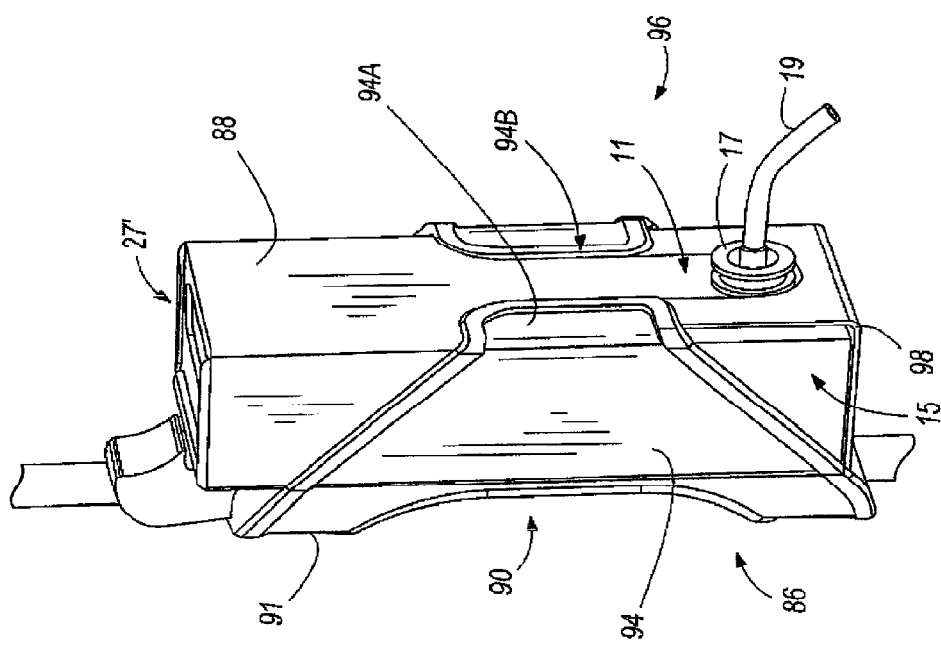
FIG. 11 is a detail perspective view of another portion of the floor tool of FIG. 1, showing an embodiment of a holster and reservoir according to the present invention.
Figure 10:
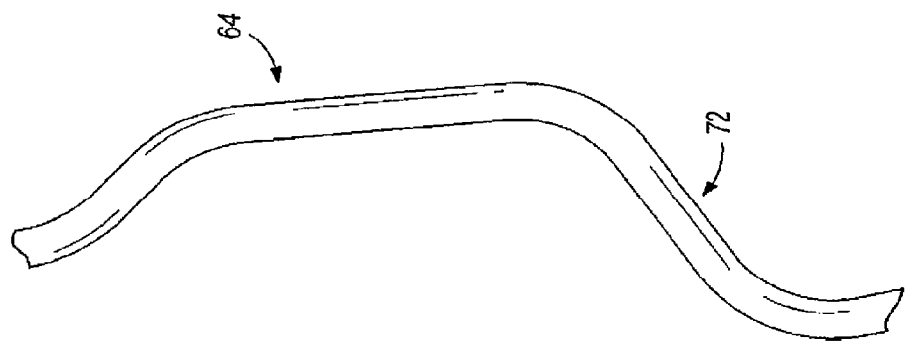
FIG. 10 is a detail perspective view of the grip portion of the floor tool of FIG. 1, shown with the grip removed.
Figure 11A:
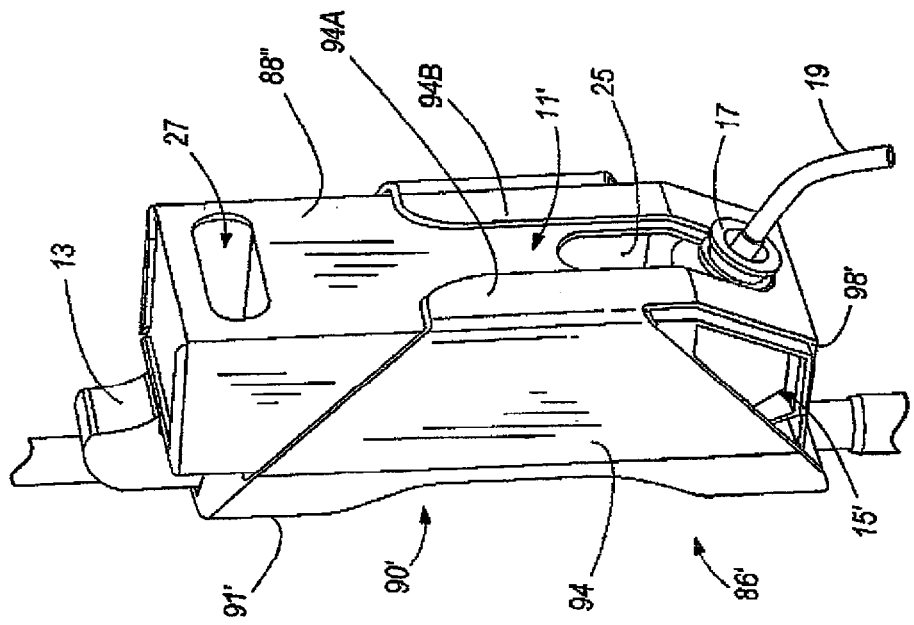
FIG. 11A is a detail perspective view of another embodiment of a holster and reservoir according to the present invention.
Figure 11B:
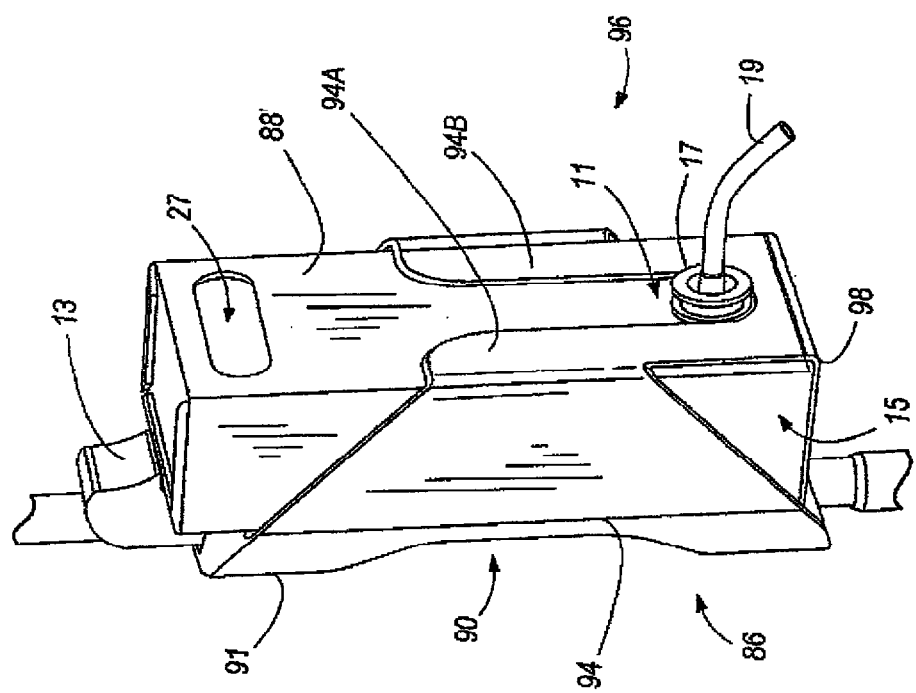
FIG. 11B is a detail perspective view of yet another embodiment of a holster and reservoir according to the present invention.
Figure 12A:
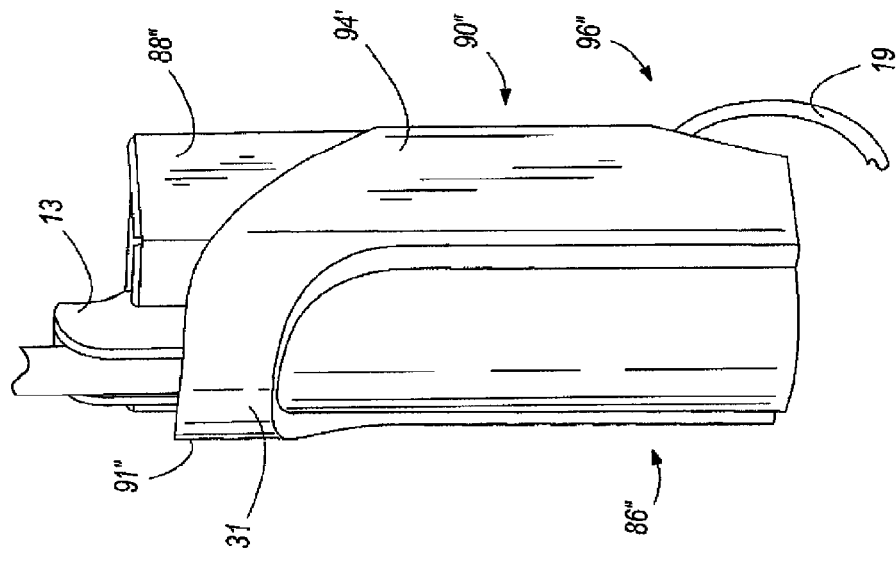
FIG. 12A is a rear perspective view of the holster and reservoir of FIG. 11B.
Figure 12:
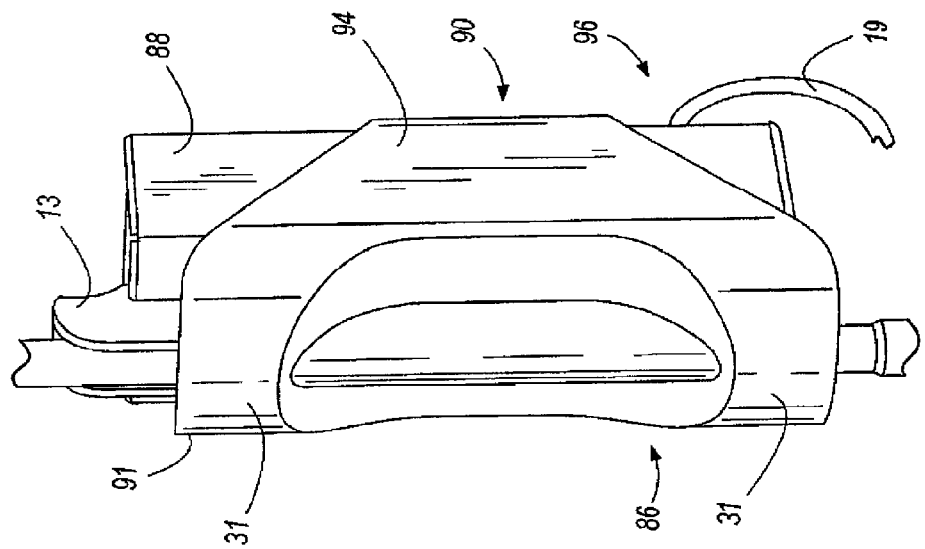
FIG. 12 is a rear perspective view of the holster and reservoir of FIG. 11.
Figure 13A:
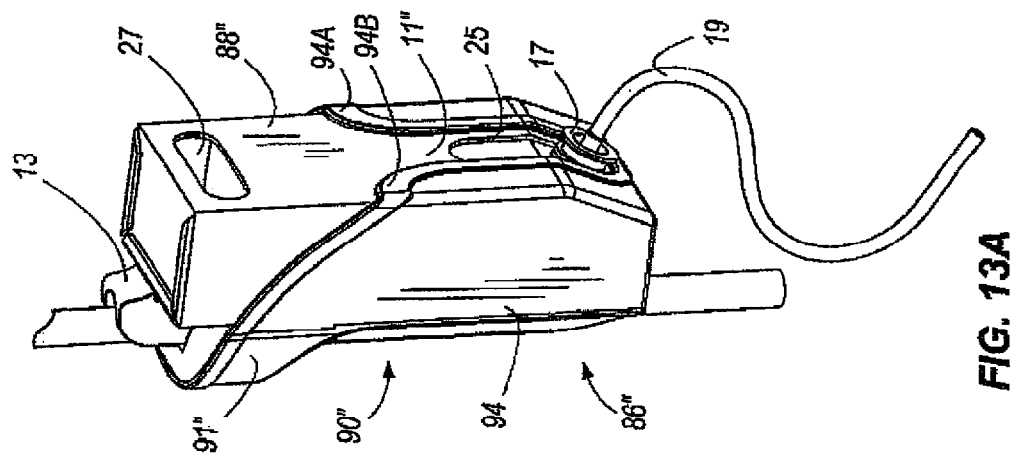
FIG. 13A is a detail perspective view of the holster including a reservoir of FIG. 13.
Figure 13:
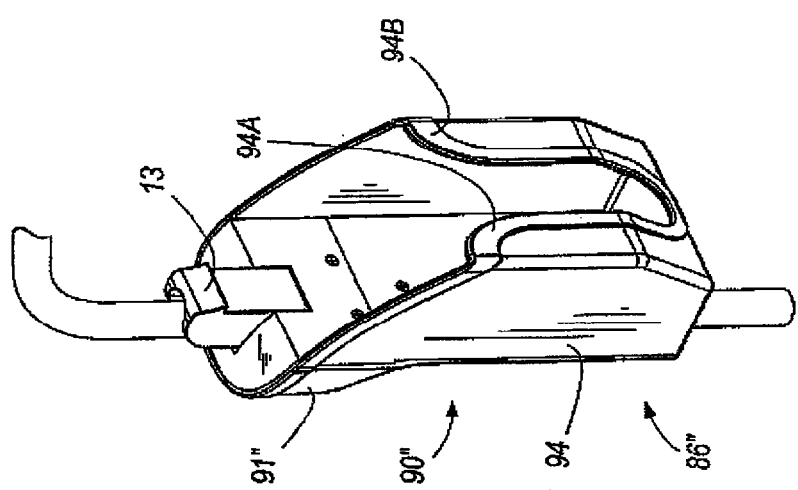
FIG. 13 is a detail perspective view of another embodiment of a holster according to the present invention.
Figure 13B:
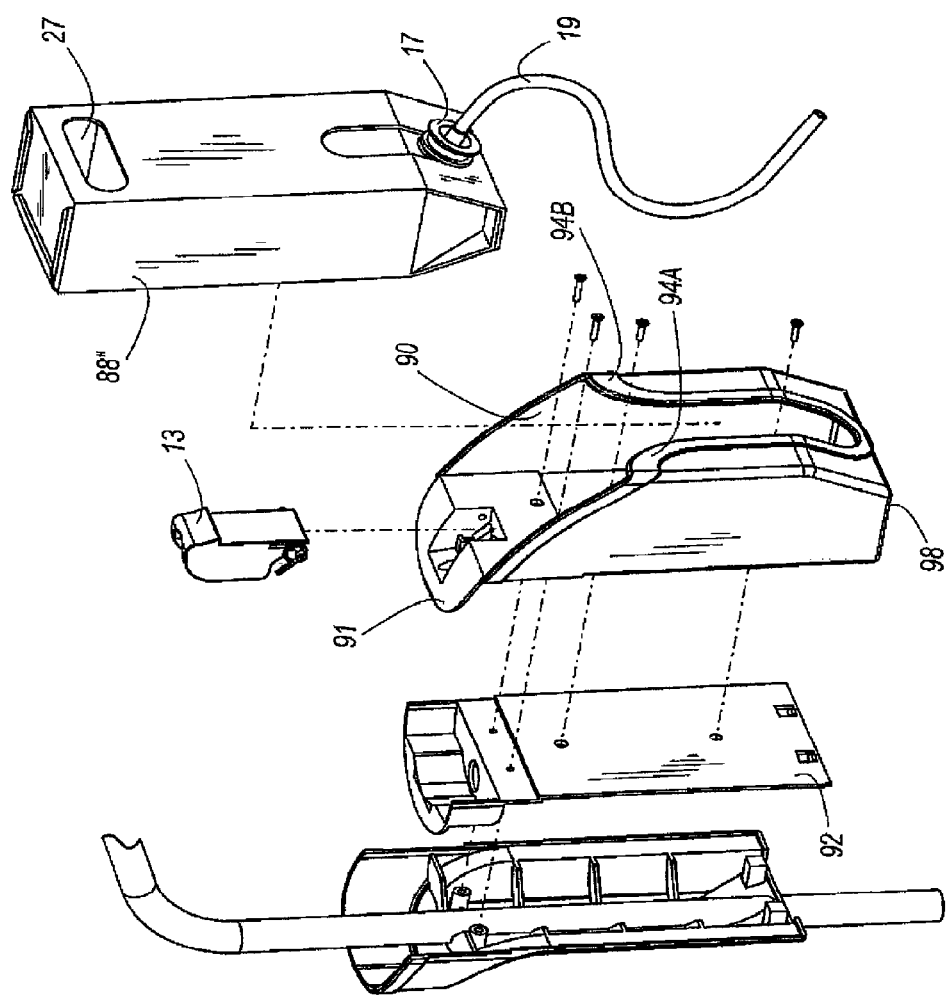
FIG. 13B is an exploded perspective view of the holster and reservoir of FIGS. 1A and 13.
Figure 13E:
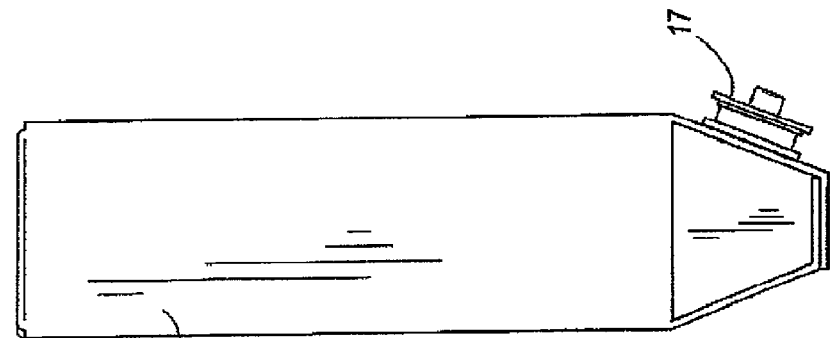
FIG. 13E is a side view of the reservoir of FIG. 13C.
Figure 13D:
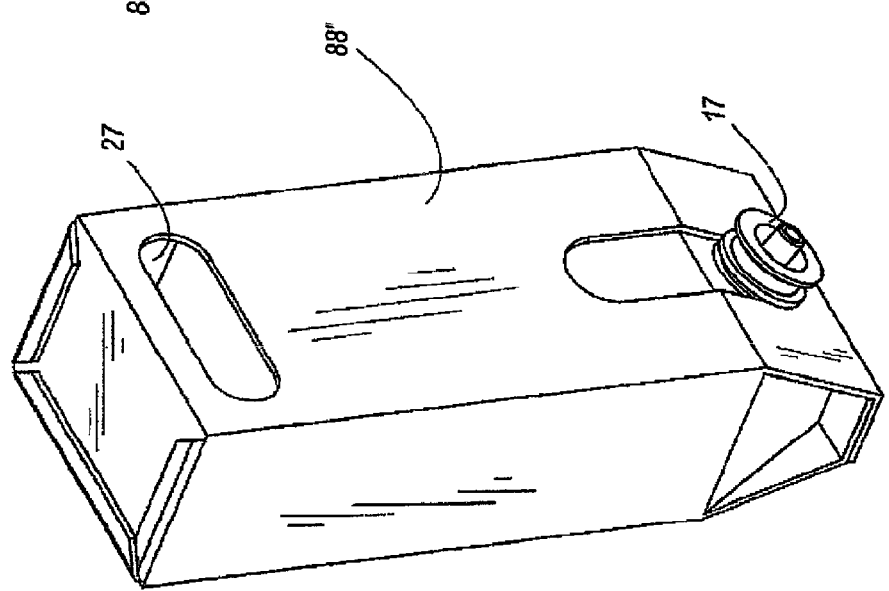
FIG. 13D is a perspective view of the reservoir of FIG. 13C.
Figure 13C:
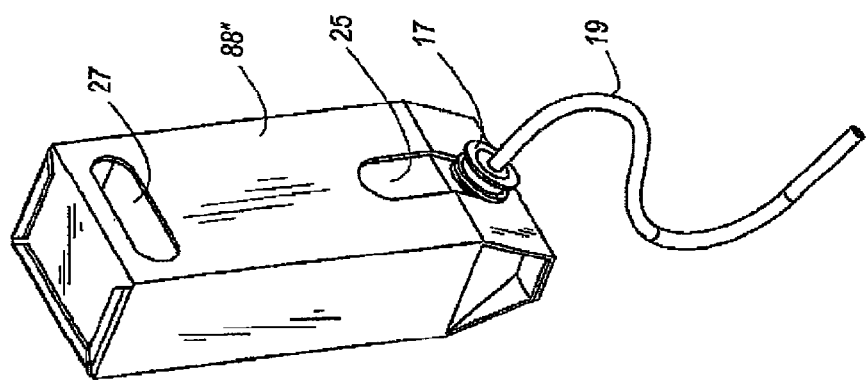
FIG. 13C is a perspective view of the reservoir of FIGS. 13A and 13B.
Figure 16:
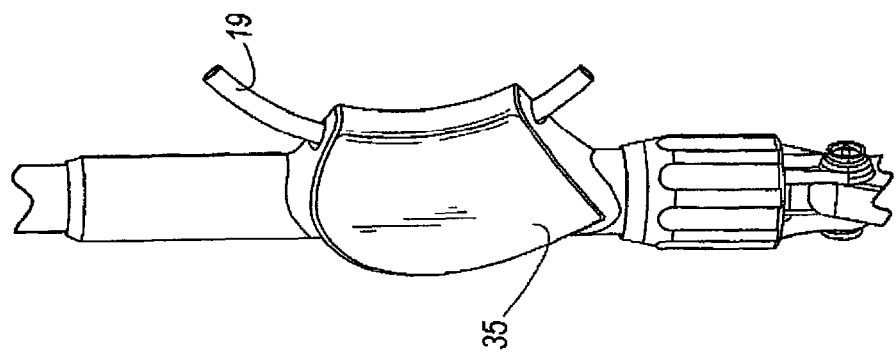
FIG. 16 is yet another perspective view of the portion of the floor tool shown in FIGS. 14 and 15.

Each of the various holster embodiments shown in FIGS. 11-13 includes a holster body 90, 90', 90" that extends around the container 88, 88', 88". The holster body 90, 90', 90" is coupled to the fifth portion 78 of the handle 12 at a rear portion 91, 91', 91" of the holster 86, 86', 86" (see FIGS. 12 and 12A). In some embodiments, the rear portion 91, 91', 91" of the holster 86, 86', 86" has a generally cylindrical aperture extending therethrough for receiving the handle 12. Alternatively, the rear portion 91, 91', 91" of the holster 86, 86', 86" can be shaped to include a concave portion that receives the fifth portion 78 of the handle 12 (such as in a snap-fit engagement). In these and other embodiments, the rear portion 91, 91', 91" of the holster 86, 86', 86" can be secured to the fifth portion 78 of the handle 12 by one or more fasteners (not shown) of any type, can be glued, welded, brazed, or otherwise bonded to the fifth portion 78 of the handle in any manner, or can be permanently or releasably attached to the fifth portion 78 of the handle 12 in any other manner. In some alternative embodiments, mating apertures and projections in the handle 12 and holster 86, 86', 86" (or in the holster 86, 86', 86" and handle 12), respectively, can be included to couple the holster 86, 86', 86" to the handle 12. Also, the holster body 90, 90', 90" in each of the illustrated embodiments can be a single element secured to the handle 12, or can instead include two or more pieces attached around the handle 12.

In some embodiments, a back plate 92 can be coupled to the rear of the holster 86, 86', 86" between the holster 86, 86', 86" and the container 88, 88', 88". As mentioned above, the holster 86, 86', 86" can have any shape suitable for supporting the container 88, 88', 88". By way of example only, the holster body 90, 90', 90" in each of the illustrated embodiments of FIGS. 11-13 includes sides 94 that extend away from the rear portion 91, 91', 91" on either side of a container 88, 88', 88" received therebetween. The illustrated sides 94 are tapered, and extend to two tab sections 94A, 94B extending toward one another at a front portion 96, 96', 96" of the holster body 90, 90', 90", thereby cradling the container 88, 88', 88". The holster body 90, 90', 90" further includes a bottom portion 98, 98', 98" that extends generally from the rear portion 91 of the holster body 90, 90', 90" toward the front portion 96, 96', 96", and then upward to join the tab sections 94A, 94B. Alternatively, the bottom portion 98, 98', 98" can extend from the sides 94 of the holster 86, 86', 86", and need not necessarily be connected directly to the front or rear portions 96, 96', 96", 91, 91', 91" of the holster body 90, 90', 90".

In some embodiments, the holster body 90, 90', 90" is shaped to define one or more apertures 15 between the bottom portion 98, 98', 98" of the holster body 90, 90', 90" and the sides 94 and/or front portion 96, 96', 96" of the holster body 90, 90', 90". The apertures 15 can have any shape and size, depending at least in part upon the shape of the holster body 90, 90', 90". In other embodiments, no such apertures 15 exist between these portions of the holster body 90, 90', 90".

In some embodiments, the holster body 90, 90', 90" is provided with an aperture 11 through which a portion of the container 88, 88', 88" and/or a conduit 19 extending from the container 88, 88', 88" passes. For example, the holster body 90, 90', 90" in the illustrated embodiments of FIGS. 11-13 each has a slot 11 in the front portion 96, 96', 96" for this purpose. In particular, the spout 17 of each container 88, 88', 88" can be received in the slot 11 when the container 88, 88', 88" is inserted into the holster 86, 86', 86".

With continued reference to the illustrated embodiments of FIGS. 11-13, each holster 86, 86', 86" is provided with a latch for retaining the container 88, 88', 88" within the holster 86, 86', 86". The latch 13 can take any form suitable for this purpose, and in the illustrated embodiments is a lever rotatably coupled to the holster 86, 86', 86" adjacent the handle 12. The illustrated latch 13 is rotatable to and from a position in which a portion of the latch 13 extends over a portion of the container 88, 88', 88" in the holster 86, 86', 86", thereby blocking the container 88, 88', 88" from removal without first moving the latch 13. To remove a container 88, 88', 88" from the holster (such as for changing the type of fluid carried by the mop 10, to replace an empty container 88, 88', 88" with a full container 88, 88', 88", and the like), the user simply presses the latch 13 in a direction toward the handle 12, and pulls the container 88, 88', 88" from the holster 86, 86', 86". The latch 13 can be biased toward a latching position by one or more springs of any type, such as a torsion spring received on a pivot of the latch 13 and biasing the latch in a rotational direction toward a container 88, 88', 88' in the holster 86, 86', 86", one or more leaf springs, extension springs, or elastic bands positioned to bias the latch 13 in such a direction, one or more magnets positioned to urge the latch in such a direction, and the like.

In some embodiments, the container 88, 88', 88" includes at least one graspable portion 27 to allow a user to easily remove the container 88, 88', 88" from the holster 86, 86', 86". Examples of graspable portions 27, 27' are illustrated in FIGS. 11, 11A, 11B, 13A, and 13B, and are shown as cutouts in a rigid or semi-rigid portion of the container 88, 88', 88" enclosing a bag of fluid (not shown). Other graspable portions, such as other apertures, protrusions extending from the container 88, 88', 88", and bars, knobs, or handles can also or instead be used. In all such cases, the graspable portion(s) 27 can have any shape and size suitable for permitting a user to remove and install the container 88, 88', 88", and fall within the spirit and scope of the present invention.

In some embodiments, an empty container 88, 88', 88" removed from the holster 86, 86', 86" is disposed of, while in other embodiments, the empty container 88, 88', 88" is removed, refilled, and replaced in the holster 86, 86', 86".

In some embodiments, one or more walls proximate a bottom end of the holster body are tapered. Examples of this tapered feature are shown in FIGS. 11B, 12B, and 13B-13E. In these embodiments, the resulting funnel-shaped end of the holster body 90', 90"can match or partially match a tapered end of a fluid container 88', 88". This tapered shape can assist in more complete drainage of fluid from the container 88', 88", and can also improve fluid flow from the container 88', 88".

In some embodiments, the container 88, 88', 88" has one or more windows 25 to allow a user to see how much fluid is left in the container 88, 88', 88". In some embodiments, these windows are located at or extend to a bottom portion of the container 88, 88', 88", such as to a position adjacent the spout 17 of the container 88, 88', 88". The window(s) 25 can be positioned adjacent the aperture 11, 11' through which the spout 17 or conduit 19 extends, so that the user can view the level of the fluid without removing the container 88, 88' from the holster 86, 86', 86". In some embodiments, a lower portion of the container 88, 88', 88" comprises a transparent or translucent material to define a window 25, whereas in other embodiments, the entire container 88, 88', 88" comprises a transparent or translucent material.

In some embodiments, the center of mass 21 of the container 86, 86', 86" is substantially aligned with the longitudinal axis 18 of the mop to help reduce the effects of the weight of the container during use. However, due to the orientation of the container 86, 86', 86" and due to the fact that the container is being emptied during use, this center of mass 21 may not always align with the longitudinal axis 18 of the mop. Due to this nature, the center of mass 21 of the container 86, 86', 86" can be offset from the longitudinal axis 18 by no greater than about 1.25 inches to provide good performance results. In other embodiments, the center of mass 21 of the container 86, 86', 86" can be offset from the longitudinal axis 18 by no greater than about 1 inches to provide good performance results. In still other embodiments, the center of mass 21 of the container 86, 86', 86" can be offset from the longitudinal axis 18 by no greater than about 0.75 inches to provide good performance results. Note that the above ranges are dependent upon the amount the container extends from the handle. For example, a container extending twice as far may affect this range proportionately.

In other embodiments, the center of mass 21 of the container 86, 86', 86" can be specifically offset slightly from the longitudinal axis 18 to provide mechanical advantage during use. Specifically, the inventors have discovered that when the center of mass 21 of the container 86, 86', 86" is offset by a distance 23 (see FIG. 1B) from the longitudinal axis 18 of the mop 10 by certain amounts, significantly greater tool control is possible, and/or significantly less effort is needed by the user to operate the tool. These offsets 23 exist in part due to the relative angles between the longitudinal axis 18 and the fifth portion 78 of the handle 12. The center of mass 21 of the container 86, 86', 86" can be offset from the longitudinal axis 18 by no less than about 0.1 inches and no greater than about 1.5 inches to provide good performance results. In other embodiments, the center of mass 21 of the container 86, 86', 86" can be offset from the longitudinal axis 18 by no less than about 0.2 inches and no greater than about 1 inch to provide good performance results. In still other embodiments, the center of mass 21 of the container 86, 86', 86" can be offset from the longitudinal axis 18 by no less than about 0.35 inches and no greater than about 0.75 inches to provide good performance results.

It will be appreciated that the center of mass 21 of the container 86, 86', 86" can move with respect to the longitudinal axis based upon the amount of fluid within the container 86, 86', 86", and also based upon the orientation of the container 86, 86', 86" (e.g., for containers 86, 86', 86" that are not completely full, the location of the fluid in the container 86, 86', 86" can change based upon the orientation of the handle 12, thereby changing the center of mass 21 of the container 86, 86', 86"). However, in some embodiments, the ranges of offset described above apply regardless of the orientation of the container 86, 86', 86" or the amount of fluid in the container 86, 86', 86". In other embodiments, the ranges of offset described above apply for containers 86, 86', 86" that are substantially full of fluid, but in any orientation of the handle 12. In these and other embodiments, the ranges of offset described above can apply for containers 86, 86', 86" connected to the tool handle 12 as described herein when the longitudinal axis 18 of the handle 12 is oriented with respect to a horizontal plane at an angle of no less than about 40 degrees and no greater than about 90 degrees (representing a range of normal operating orientations of the handle 12 and container 86, 86', 86").

In some embodiments, a container 88, 88', 88" can be received within the holster 86, 86', 86" and can extend from the top of the holster 86, 86', 86" a distance greater than that shown in the illustrated embodiments. In such cases, a non-tapered containers 88, 88', 88" can be used even with tapered holsters 86', 86". Also, this positional relationship of the container 88, 88', 88" with respect to the holster 86, 86', 86" can permit oversized containers 88, 88', 88" to be used with the mop 10, thereby permitting greater amounts of fluid to be carried by the handle 12. In some embodiments, at least 5% of the overall length of the container 88, 88', 88" can extend over the upper edge of the holster 86, 86', 86" without significantly impacting operation of the mop 10. In other embodiments, at least 10% of the overall length of the container 88, 88', 88" can extend over the upper edge of the holster 86, 86', 86" without significantly impacting operation of the mop 10. In still other embodiments, at least 20% of the overall length of the container 88, 88', 88" can extend over the upper edge of the holster 86, 86', 86" without significantly impacting operation of the mop 10.

As shown in FIGS. 1, 1B, 1C, and 11-13B, a length of conduit 19 extends from a portion of the container 88, 88', 88" facing away from the handle 12 and toward the mop head 24. The conduit 19 can be inserted within a valve 33 that functions to selectively open and close fluid flow from the container 88, 88', 88" through the conduit 19. As best shown in FIGS. 1, 1B, and 1C, the valve 33 can be positioned along the fifth portion 78 of the handle 12 at a location between the holster 86 and the mop head 24.

With reference now to FIGS. 14-19 and 20-25, two valve assemblies having similar construction are illustrated. The valve 33 of each embodiment includes a valve body 35 that can be permanently or releasably coupled to the handle 12. The valve body 35 can be defined by any number of parts connected together in any desired manner. For example, the valve body 35 illustrated in FIGS. 14-19 includes a tubular portion shaped and dimensioned to be received on the handle 12, and a cover 37 that can be secured to the tubular portion by screws. Alternatively, the cover 37 can be attached to the rest of the valve body 35 by bolts, pins, rivets, nails, brads, staples, clamps, clasps, and other fasteners, and inter-engaging elements. In other embodiments, the valve body 35 can have other shapes adapted for attachment to the handle 12, including without limitation valve bodies having two or more portions connected together about the handle 12 (which in some cases can be a clamping arrangement), valve bodies adapted to be secured to a side of the handle 12 by screws, bolts, pins, rivets, nails, brads, staples, or other fasteners, or inter-engaging elements on the valve body 35 and handle 12, and the like.

The valve 33 further includes a gap in which the conduit from the container 88, 88', 88" is insertable. This gap is defined between two portions of the valve, and in some embodiments takes the form of a channel 39 in the valve body 35 (and more specifically, in the cover 37 of the valve body 35 in the illustrated embodiment of FIGS. 14-19). The channel 39 in the cover 37 is generally elongated and arcuate in shape, although the channel 39 need not necessarily be elongated or arcuate in other embodiments. Furthermore, the channel 39 in the illustrated embodiment of FIGS. 14-19 and 20-25 has an open side, two opposing channel side walls, and a channel bottom. Accordingly, the channel 39 is shaped to laterally receive the conduit 19, thereby eliminating the requirement of threading or feeding the conduit 19 through an aperture that is closed on all peripheral sides (e.g., a hole). This enables a user to install the conduit 19 in to the valve and to remove the conduit 19 from the valve without access to a free end of the conduit 19.

Figure 15:
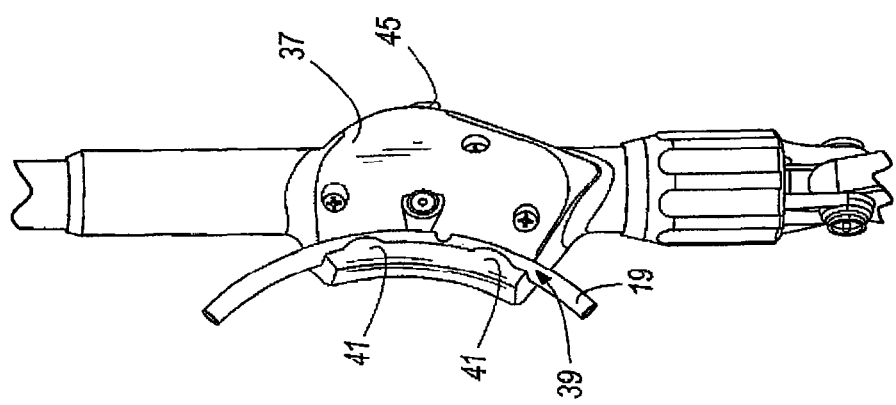
FIG. 15 is another perspective view of the portion of the floor tool shown in FIG. 14.
Figure 14:
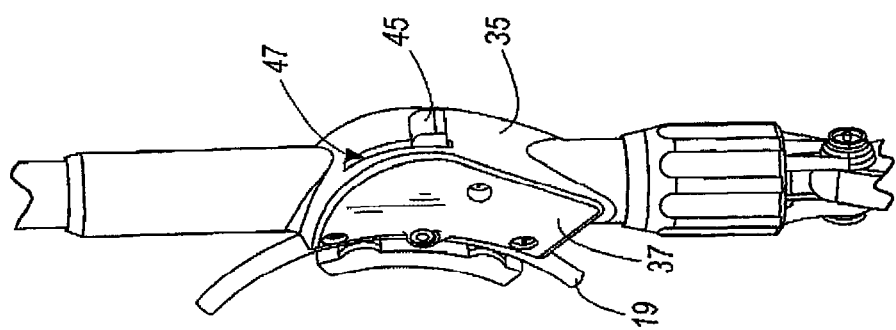
FIG. 14 is a perspective view of another portion of the floor tool of FIG. 1, showing the valve of the floor tool.
Figure 17:
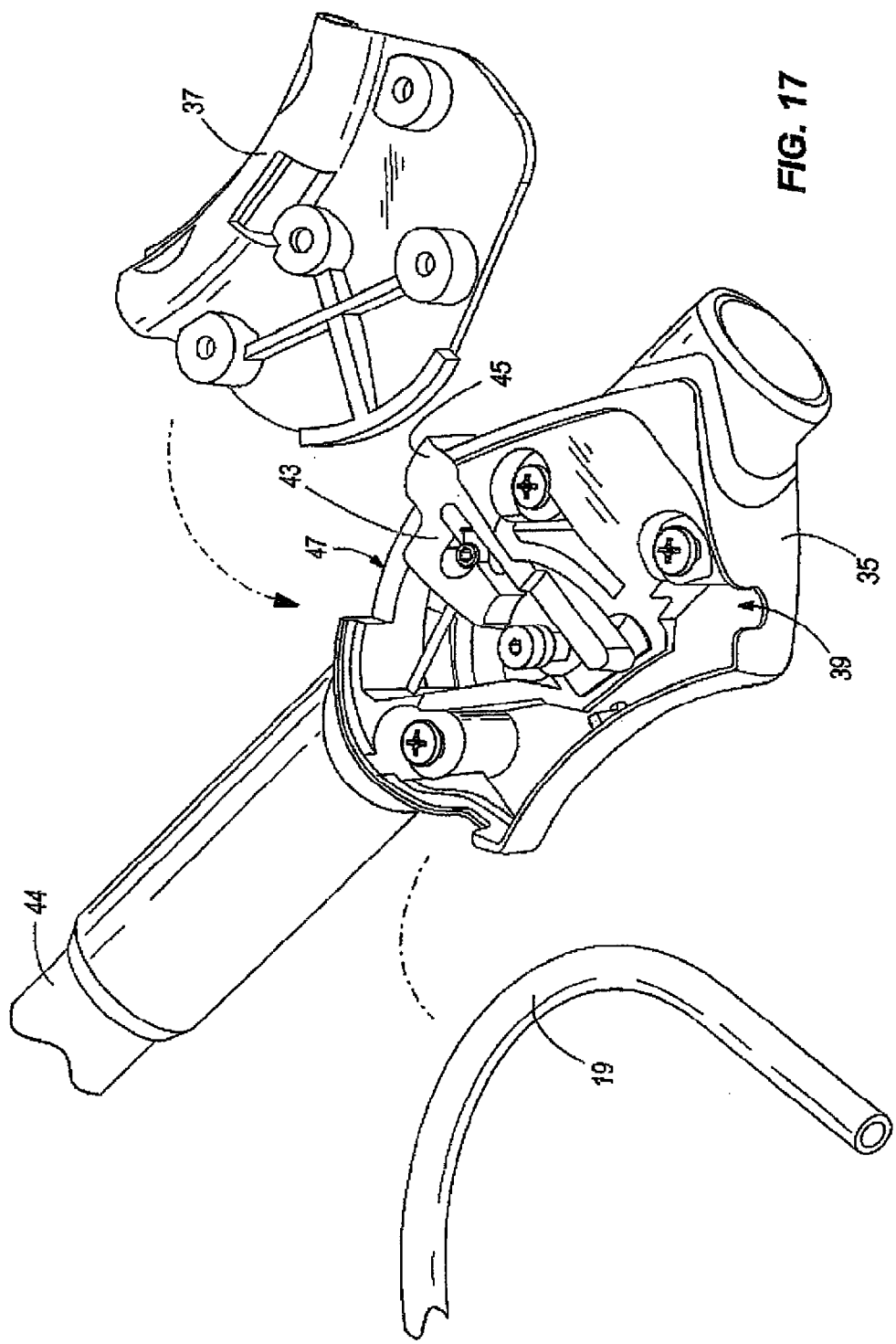
FIG. 17 is an exploded perspective view of the valve shown in FIGS. 1 and 14-16.
Figure 22:
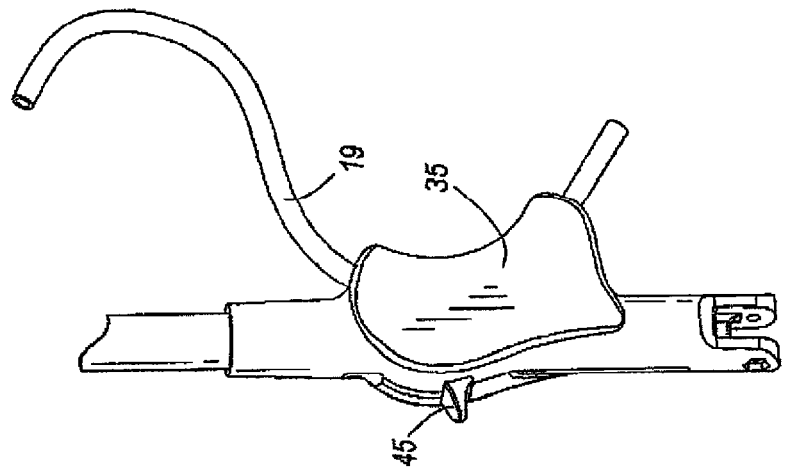
FIG. 22 is yet another perspective view of the portion of the floor tool shown in FIGS. 20 and 21.
Figure 21:
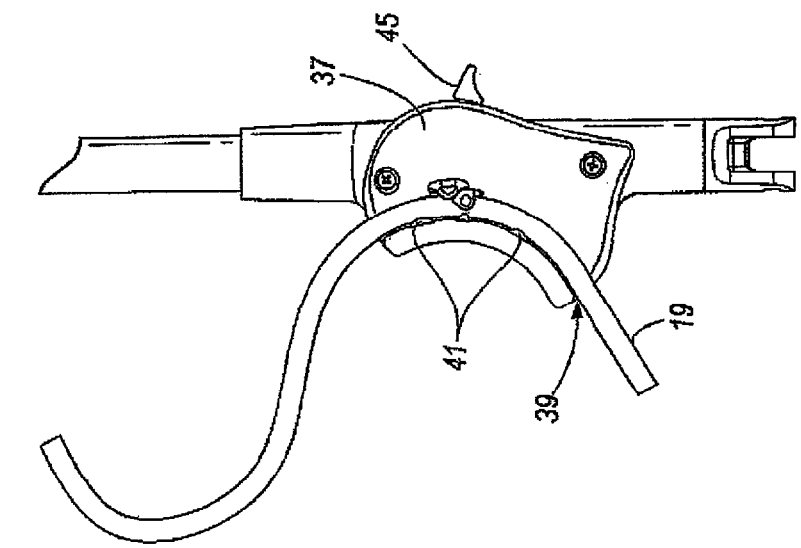
FIG. 21 is another perspective view of the portion of the floor tool shown in FIG. 20.
Figure 20:
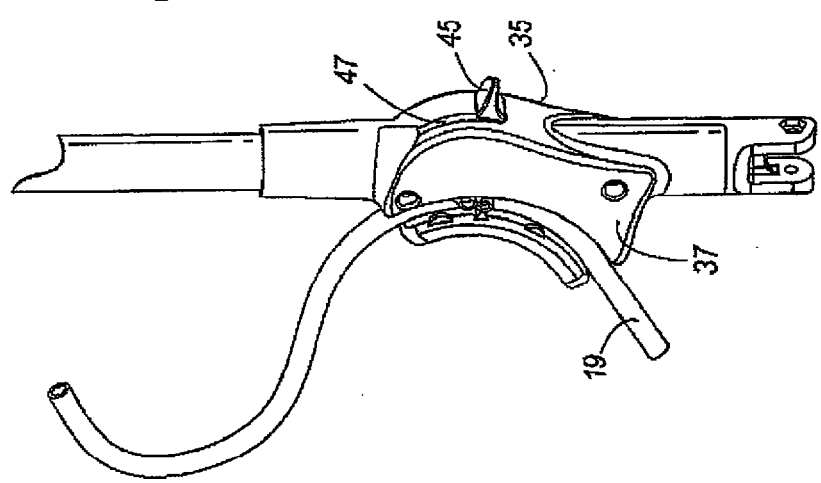
FIG. 20 is a perspective view of another portion of the floor tool of FIG. 1A, showing the valve of the floor tool.
Figure 23:
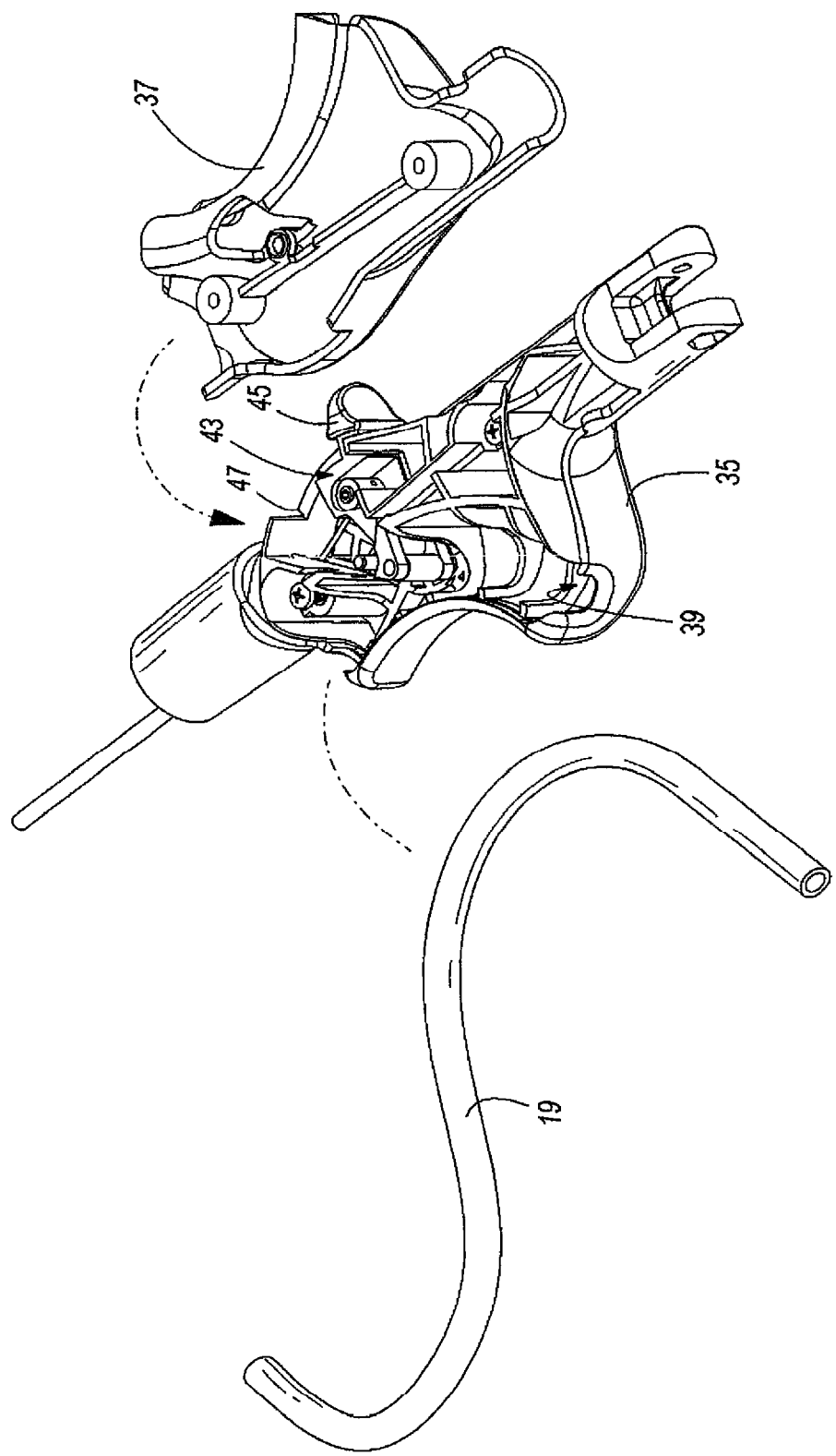
FIG. 23 is an exploded perspective view of the valve shown in FIGS. 1A and 20-22.

In some embodiments, the valve body 35 has a plurality of tabs 41 or other protrusions extending partially across the channel 39, as best illustrated in FIGS. 15 and 21. These tabs can help to retain the conduit 19 within the channel 39 once inserted. Also, in some embodiments, the conduit 19 has markings to indicate which portion of conduit 19 should be inserted into the valve 33.

With continued reference to the illustrated embodiment of FIGS. 14-19 and 20-25, some embodiments of the valve 33 further include a lever 43. The lever 43 in the illustrated embodiment pivots about a point adjacent the channel 39, and extends away from the channel 39. In some embodiments, the lever 43 has a lever end 45 that extends out of the valve housing 35, as best shown by way of example in FIGS. 18 and 19. The lever end 45 is moveable through an arcuate path along an aperture 47 in the valve housing, permitting a user to actuate the valve 33 at the location of the valve 33.

The lever 43 illustrated in FIGS. 18 and 19 (and FIGS. 24 and 25) is pivotable between an open position (see FIGS. 18 and 24), where the lever 43 does not pinch the conduit to inhibit flow of fluid therethrough or pinches the conduit to an insufficient amount to substantially inhibit such flow, and a closed position (see FIGS. 19 and 25), where the lever 43 directly or indirectly pinches the conduit 19 to inhibit fluid flow therethrough. In some embodiments, the lever 43 can be normally biased toward the closed position, to inhibit unwanted dispensing of fluid. This bias can be generated by a number of different biasing elements connected to the lever 43, including without limitation springs, elastic bands, and magnets. For example, the lever 43 in the illustrated embodiment of FIGS. 14-19 and FIGS. 20-25 is biased toward a closed position by a torsion spring 49 received on the same pivot pin about which the lever 43 pivots.

The lever 43 in the illustrated embodiments of FIGS. 14-19 and FIGS. 20-25 can be moved to an open position by creating a force that is greater than the biasing force of the torsion spring 49 or other biasing mechanism (if used). In some embodiments, the lever 43 is connected to the cable 44 or other elements extending to and connected to the trigger 34 as described above. Therefore, by squeezing the trigger 34 according to any of the embodiments described above, the cable 44 is pulled or pushed, thereby generating pivoting movement of the lever 43.

Figure 26:
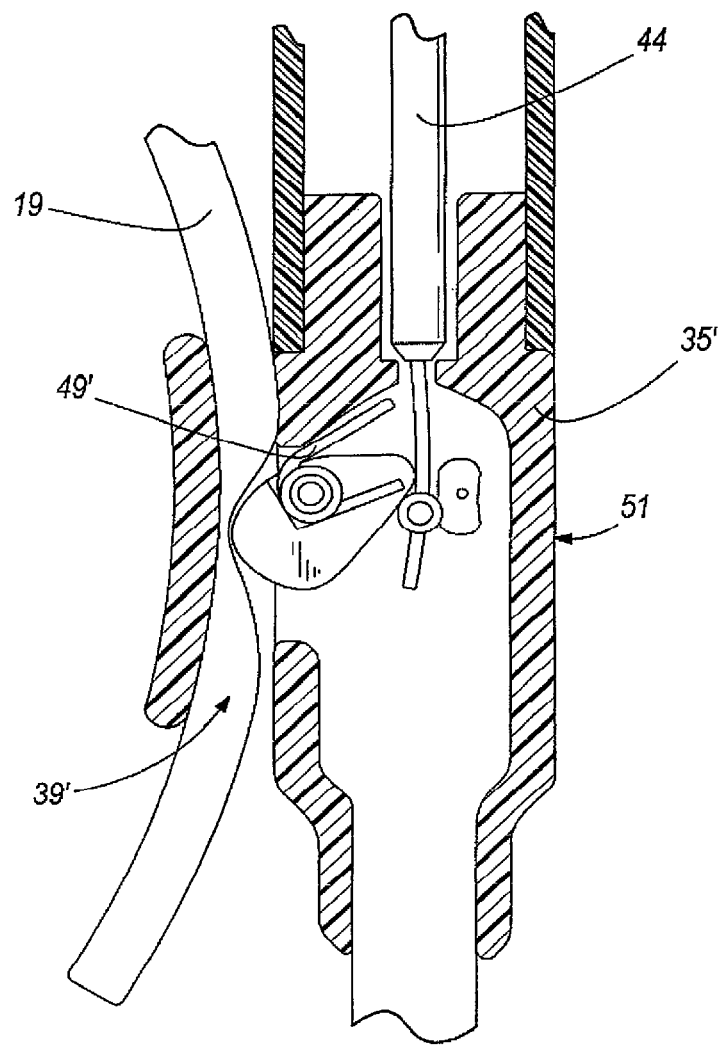
FIG. 26 is a detail cross-sectional view of a floor tool according to another embodiment of present invention, showing the valve of the floor tool in a closed position.

Another valve according to another embodiment of the present invention is shown in FIG. 26, and operates using generally the same gap and pinching lever features described above. In still other embodiments, other elements of the valve 33 cause pinching of the conduit 19 when they are actuated (e.g., by the cable 44 or other elements connected to the trigger 34 and/or extending to a user-accessible location at the valve 33). These elements include, without limitation, an eccentric cam rotatable into and out of pinching relationship with respect to the conduit 19, a slide having a portion movable into and out of pinching relationship with respect to the conduit 19, and the like.

Although the gap in which the conduit 19 is laterally insertable in the illustrated embodiment is defined by a channel in a wall of the valve body 35, it should be noted that this gap can be defined by other elements. By way of example only, the gap can be defined between a wall of the valve body 35 and a roller, cam, or lever actuatable as described above.

Figure 27:
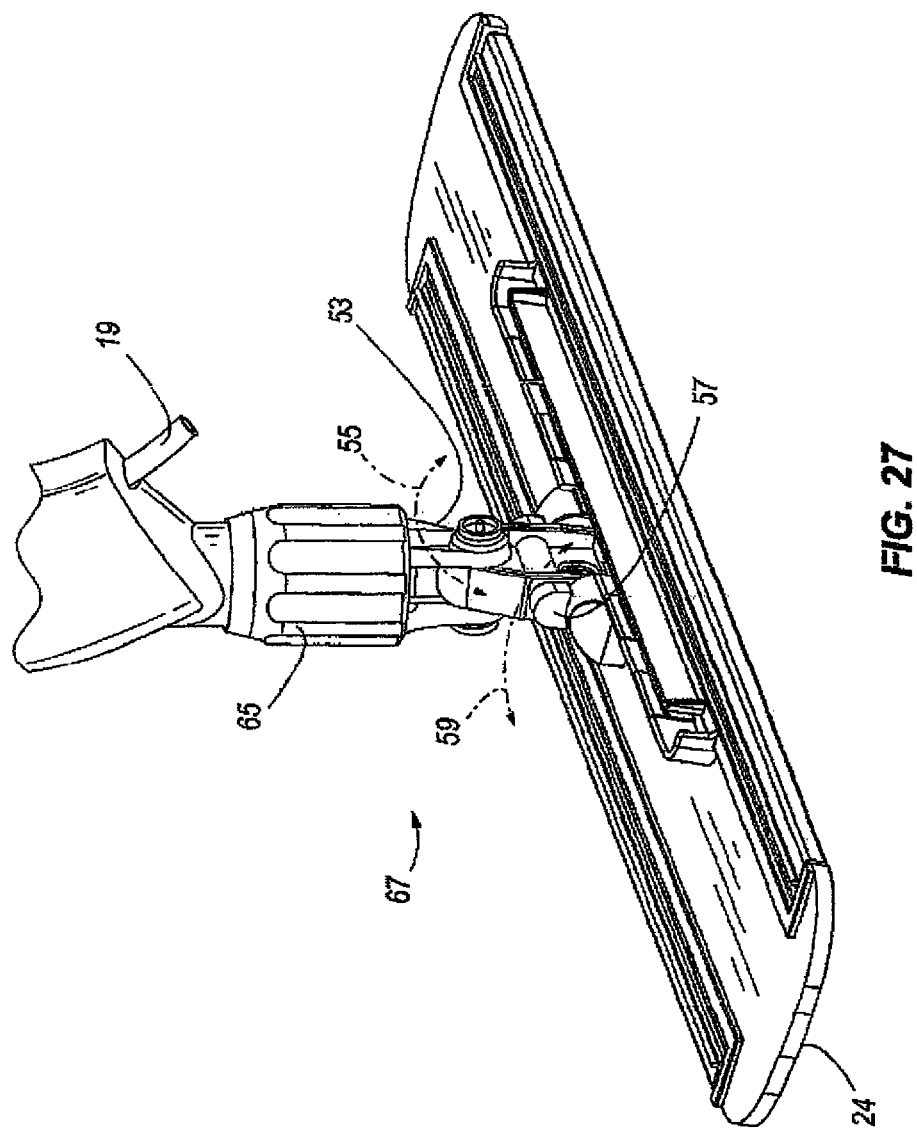
FIG. 27 is a detail perspective view of another portion of the floor tool of FIG. 1, showing the head and handle-to-head joint of the floor tool.

In some embodiments, the mop head 24 is pivotably coupled to the fifth portion 78 of the handle 12. This connection can define one, two, or three degrees of freedom, depending at least in part upon the type of pivotable connection used. For example, some embodiments of the mop 10 employ a pivot joint permitting mop head pivoting motion about two different axes. With reference to FIGS. 27 and 27A, for example, a first pivot joint 53 allows the handle 12 to pivot in a first direction, as indicated by arrow 55, while a second pivot joint 57 allows the handle 12 to pivot in a second direction, as indicated by arrow 59. These pivot joints 53, 57 work together in a manner similar to that of a universal joint. Using this type of joint, the mop head 24 can be propelled along a floor surface with the handle 12 at any of a wide variety of positions along the first and second arrows 55, 59.

In some embodiments, the joint 67 includes first and second pivot joints 53, 57. The second pivot joint 57 is pivotably coupled to the mop head 24, while the first pivot joint 53 is pivotably coupled to the second pivot joint 57. The first pivot joint 53 can include threads on an outer portion, so that the handle 12 can be inserted within the first pivot joint 53 and can be secured to the first pivot joint 53 by threading a collar 65 onto the first pivot joint 53. In other embodiments, the handle 12 is press-fit into the first pivot joint 53, is joined directly to the first pivot joint 53 by a threaded connection between the handle 12 and the first pivot joint 53, is pinned or clamped to the first pivot joint 53, or is secured thereto in any other manner. In still other embodiments, one or more fasteners can be used to couple the handle 12 to the first pivot joint 53.

While the joint 67 of FIG. 27A is configured and operates substantially similar to the joint illustrated in FIG. 27, the joint 67 is coupled to the handle in substantially a different manner. Specifically, the joint 67 is integrally formed with the valve assembly. Thus, the joint 67 and valve assembly is formed as a unitary subassembly and coupled to the handle as such. The handle can be coupled to this subassembly any of the ways discussed above or alternative ways known in the art.

In operation, a user can grasp the first grip 22 with a first hand and the second grip 68 with a second hand in the orientation shown in FIG. 1A. The offset 23 between the center of gravity of the container 88, 88', 88" and the longitudinal axis 18 of the mop 24 enables the operator to easily change the direction of the mop 10 due to the increased torque offered by the shape of the mop handle 12. In order to dispense fluid onto a floor surface, the user can squeeze the trigger 34, thereby pulling the cable 44 (or other element(s) connected to the valve 33) toward the first end 14 of the mop 14 to actuate the valve 33. The valve lever 43 is pivoted away from engagement with the conduit 19 so allow a quantity of fluid to flow therethrough for use in operation of the mop 10.

When the container 88, 88', 88" becomes empty, as can be noted by viewing the level of fluid through the window 25 (if provided), the user can grasp the graspable portion 27 of the container 88, 88', 88" and move the latch 13 to remove the container 88, 88', 88" from the holster 86, 86', 86". The conduit 19 can be laterally removed from the valve 33, when the operator lifts the lever 43, either by squeezing the trigger 34 or by actuating the lever end 45 at the valve 33. The user can either refill the container 88, 88', 88" or dispose of it, and can insert a full container 88, 88', 88" into the holster 86, 86', 86". The conduit 19 can then be laterally inserted into the valve 33 by lifting the lever 43 as described above.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A floor tool comprising:
   a handle having first and second opposite ends through which a longitudinal axis of the handle extends;
   a mop head coupled at the second end of the handle;
   a fluid reservoir coupled to and carried by the handle at a location between the first and second ends of the handle, the fluid reservoir having a center of mass offset from the longitudinal axis; and
   a portion of the handle disposed between the fluid reservoir and the first end of the handle, the portion of the handle extending alongside and offset from the longitudinal axis more than the center of mass of the fluid reservoir.

2. The floor tool of claim 1, wherein the handle has a serpentine shape.

3. The floor tool of claim 1, wherein the handle substantially lies within a single plane.

4. The floor tool of claim 1, wherein a majority of the handle is free from intersection with the longitudinal axis.

5. The floor tool of claim 4, wherein at least eighty percent of the tool handle is free from intersection with the longitudinal axis.

6. The floor tool of claim 1, wherein the first and second opposite ends of the handle intersect the longitudinal axis, and wherein the handle crosses the longitudinal axis at one location between the first and second opposite ends.

7. The floor tool of claim 1, further comprising a first hand grip positioned adjacent the first end and a second hand grip positioned between the first end and the fluid reservoir, wherein the second hand grip is offset from the longitudinal axis.

8. The floor tool of claim 1, further comprising a holster removably coupling the fluid reservoir to the handle.

9. The floor tool of claim 1, wherein the portion of the handle is offset from the longitudinal axis by no less than about 1 inch.

10. The floor tool of claim 9, wherein the portion of the handle is offset from the longitudinal axis by no less than about 2 inches.

11. The floor tool of claim 9, wherein the portion of the handle is offset from the longitudinal axis by no less than about 3 inches.

12. The floor tool of claim 10, wherein the center of mass of the fluid reservoir is offset from the longitudinal axis by no less than about 0.1 inches and no greater than about 1.5 inches.

13. The floor tool of claim 10, wherein the center of mass of the fluid reservoir is offset from the longitudinal axis by no less than about 0.2 inches and no greater than about 1.0 inches.

14. The floor tool of claim 10, wherein the center of mass of the fluid reservoir is offset from the longitudinal axis by no less than about 0.35 inches and no greater than about 0.75 inches.

15. The floor tool of claim 1, wherein the handle includes a user-manipulatable control adjacent first end such that actuation of the control dispenses fluid from the fluid reservoir.

16. The floor tool of claim 15, wherein actuation of the user-manipulatable control actuates a valve.

17. The floor tool of claim 1, wherein the fluid reservoir is located below a midpoint of the handle.

18. The floor tool of claim 1, wherein the portion of the handle is parallel to the longitudinal axis.

19. A floor tool comprising:
a handle having first and second opposite ends through which a longitudinal axis of the handle extends;
a mop head coupled at the second end of the handle;
a fluid reservoir coupled to and carried by the handle at a location below a midpoint of the handle, the fluid reservoir having a center of mass offset from the longitudinal axis; and
a portion of the handle disposed between the fluid reservoir and the first end of the handle, the portion of the handle offset from the longitudinal axis more than the center of mass of the fluid reservoir; wherein the portion of the handle is continuous relative to the remainder of the handle extending between the first end and the second end.

20. A floor tool of claim 19, wherein the portion of the handle is above the midpoint.

21. A floor tool of claim 20, wherein the portion of the handle is substantially parallel to the longitudinal axis.

22. A floor tool comprising:
a handle having first and second opposite ends through which a longitudinal axis of the handle extends, the handle including a first portion disposed on a first side of the longitudinal axis and defining a grip, the handle further including a second portion disposed on a second side of the longitudinal axis opposite the first side;
a mop head coupled at the second end of the handle; and
a fluid reservoir coupled to the handle at the second portion, wherein the longitudinal axis extends through the handle at two locations along the handle between the first and second ends.

23. A floor tool of claim 22, wherein the fluid reservoir has a center of mass offset from the longitudinal axis.

24. A floor tool of claim 22, wherein the handle substantially lies within a single plane.

25. A floor tool of claim 22, wherein the first portion and the second portion intersect at a point on the longitudinal axis, the point located between the first and second ends of the handle.

* * * * *